United States Patent
Yamamoto et al.

(10) Patent No.: US 12,522,231 B2
(45) Date of Patent: Jan. 13, 2026

(54) DRIVING CONTROL DEVICE AND HMI CONTROL DEVICE

(71) Applicant: DENSO CORPORATION, Kariya (JP)

(72) Inventors: Takeshi Yamamoto, Kariya (JP); Asako Nagata, Kariya (JP); Shizuka Yokoyama, Kariya (JP); Yuji Ota, Kariya (JP); Takuya Kume, Kariya (JP); Kazuki Kojima, Kariya (JP)

(73) Assignee: DENSO CORPORATION, Kariya (JP)

( * ) Notice: Subject to any disclaimer, the term of this patent is extended or adjusted under 35 U.S.C. 154(b) by 605 days.

(21) Appl. No.: 17/862,524

(22) Filed: Jul. 12, 2022

(65) Prior Publication Data

US 2022/0340156 A1   Oct. 27, 2022

Related U.S. Application Data

(63) Continuation of application No. PCT/JP2020/047991, filed on Dec. 22, 2020.

(30) Foreign Application Priority Data

Jan. 17, 2020  (JP) .................................. 2020-006066
Dec. 9, 2020   (JP) .................................. 2020-204442

(51) Int. Cl.
*B60W 50/14*  (2020.01)
*B60W 50/08*  (2020.01)
*B60W 60/00*  (2020.01)

(52) U.S. Cl.
CPC .......... *B60W 50/082* (2013.01); *B60W 50/14* (2013.01); *B60W 60/0016* (2020.02);
(Continued)

(58) Field of Classification Search
CPC ............... B60W 50/082; B60W 50/14; B60W 60/0016; B60W 60/0057;
(Continued)

(56) References Cited

U.S. PATENT DOCUMENTS 11,332,158 B2 *   5/2022   Hecker ............... B60W 50/029
2012/0212353 A1   8/2012   Fung et al.
(Continued)

FOREIGN PATENT DOCUMENTS

CN   109791054 A   5/2019
JP   2016115356 A  6/2016
(Continued)

*Primary Examiner* — Ramya P Burgess
*Assistant Examiner* — Chanmin Park
(74) *Attorney, Agent, or Firm* — Harness, Dickey & Pierce, P.L.C.

(57) ABSTRACT

An HMI control device includes an automation level acquisition portion and a display control unit. The automation level acquisition portion acquires an autonomous driving level determined by a driving control device. The display control portion controls an image display operation of an HMI device according to the autonomous driving level acquired by the automation level acquisition portion. When terminating a high autonomous driving level as the autonomous driving level, the display control portion controls the HMI device to provide an action instruction display that instructs the driver to take a low-level associated state so as to handle a low autonomous driving level. The low autonomous driving level is the autonomous driving level under which an in-vehicle system including the driving control device is prohibited from performing at least one of a lateral motion control realized by performing steering and a longitudinal motion control realized by performing acceleration/deceleration.

21 Claims, 15 Drawing Sheets

(52) U.S. Cl.
CPC ... *B60W 60/0057* (2020.02); *B60W 2050/146* (2013.01); *B60W 2540/223* (2020.02); *B60W 2540/229* (2020.02); *B60W 2710/20* (2013.01); *B60W 2720/106* (2013.01)

(58) Field of Classification Search
CPC ..... B60W 2050/146; B60W 2540/223; B60W 2540/229; B60W 2710/20; B60W 2720/106; B60W 60/00; B60W 60/00136; B60K 2360/164; B60K 2360/175; B60K 35/28; G08G 1/16
See application file for complete search history.

(56) References Cited

U.S. PATENT DOCUMENTS

| | | | |
|---|---|---|---|
| 2013/0226408 A1 | 8/2013 | Fung et al. | |
| 2013/0245886 A1 | 9/2013 | Fung et al. | |
| 2014/0309881 A1 | 10/2014 | Fung et al. | |
| 2014/0371984 A1 | 12/2014 | Fung et al. | |
| 2016/0031479 A1 | 2/2016 | Fung et al. | |
| 2016/0107653 A1 | 4/2016 | Fung et al. | |
| 2016/0152233 A1 | 6/2016 | Fung et al. | |
| 2017/0090480 A1* | 3/2017 | Ho | B60W 30/00 |
| 2017/0334452 A1* | 11/2017 | Abe | G01C 21/3658 |
| 2017/0355377 A1* | 12/2017 | Vijaya Kumar | B60W 50/0098 |
| 2017/0364070 A1 | 12/2017 | Oba | |
| 2018/0072310 A1 | 3/2018 | Fung et al. | |
| 2018/0105180 A1 | 4/2018 | Fung et al. | |
| 2018/0297611 A1* | 10/2018 | Fujisawa | G05D 1/0212 |
| 2018/0345980 A1* | 12/2018 | Morita | B60W 60/0059 |
| 2019/0004514 A1 | 1/2019 | Hiwatashi et al. | |
| 2019/0271981 A1 | 9/2019 | Oba | |
| 2019/0324451 A1 | 10/2019 | Obata et al. | |
| 2020/0017118 A1 | 1/2020 | Miyahara et al. | |
| 2020/0283028 A1* | 9/2020 | Oba | B60W 60/0057 |
| 2020/0298876 A1 | 9/2020 | Mimura et al. | |
| 2020/0342760 A1* | 10/2020 | Vassilovski | H04W 4/40 |
| 2020/0377126 A1 | 12/2020 | Obata et al. | |
| 2021/0286357 A1 | 9/2021 | Oba | |

FOREIGN PATENT DOCUMENTS

| | | |
|---|---|---|
| JP | 2017090996 A | 5/2017 |
| JP | 2017107502 A | 6/2017 |
| JP | 2019001350 A | 1/2019 |
| JP | 2019010929 A | 1/2019 |
| JP | 2019023079 A | 2/2019 |
| JP | 6552750 B2 | 7/2019 |
| JP | 2019127078 A | 8/2019 |
| WO | WO-2017/158772 A1 | 9/2017 |
| WO | WO-2018066023 A1 | 4/2018 |
| WO | WO-2019003294 A1 | 1/2019 |

* cited by examiner

DRIVING CONTROL DEVICE AND HMI CONTROL DEVICE

CROSS REFERENCE TO RELATED APPLICATIONS

This application is a continuation application of International Patent Application No. PCT/JP2020/047991 filed on Dec. 22, 2020, which designated the U.S. and claims the benefit of priority from Japanese Patent Application No. 2020-006066 filed on Jan. 17, 2020 and Japanese Patent Application No. 2020-204442 filed on Dec. 9, 2020, the entire of which is incorporated herein by reference.

TECHNICAL FIELD

The present disclosure relates to a driving control device to control an operation of a vehicle capable of performing automated driving and an HMI control device to control an HMI device mounted on the vehicle. HMI stands for Human Machine Interface.

BACKGROUND

There are proposed various autonomous driving systems for vehicles such as automobiles. During automated driving (or autonomous driving), a driver, as an occupant in the driver's seat in the vehicle, can freely perform a second task. The second task signifies a task other than driving operations performed by the driver. The second task includes manipulating a mobile terminal or viewing video content, for example. The second task is also referred to as a "non-driving task" or a "secondary activity."

SUMMARY

One aspect of the present disclosure is an HMI control device configured to control an HMI device that displays an image visibly recognized by a driver of a vehicle. The vehicle is capable of performing automated driving. The HMI control device includes: an automation level acquisition portion that is configured to acquire an autonomous driving level determined by a driving control device that is configured to control an operation of the vehicle; and a display control portion that is configured to control an image display operation of the HMI device according to the autonomous driving level acquired by the automation level acquisition portion. When terminating a high autonomous driving level as the autonomous driving level under the automated driving, the display control portion is configured to control the HMI device to provide an action instruction display that instructs the driver to take a low-level associated state as a driver state so as to handle a low autonomous driving level. The low autonomous driving level is lower than the high autonomous driving level.

BRIEF DESCRIPTION OF THE DRAWINGS

FIG. 25 is a time chart illustrating the transition of autonomous driving levels according to an eighth embodiment;

FIG. 26 is a time chart illustrating the transition of autonomous driving levels according to the eighth and ninth embodiments;

DETAILED DESCRIPTION

Figure 1:
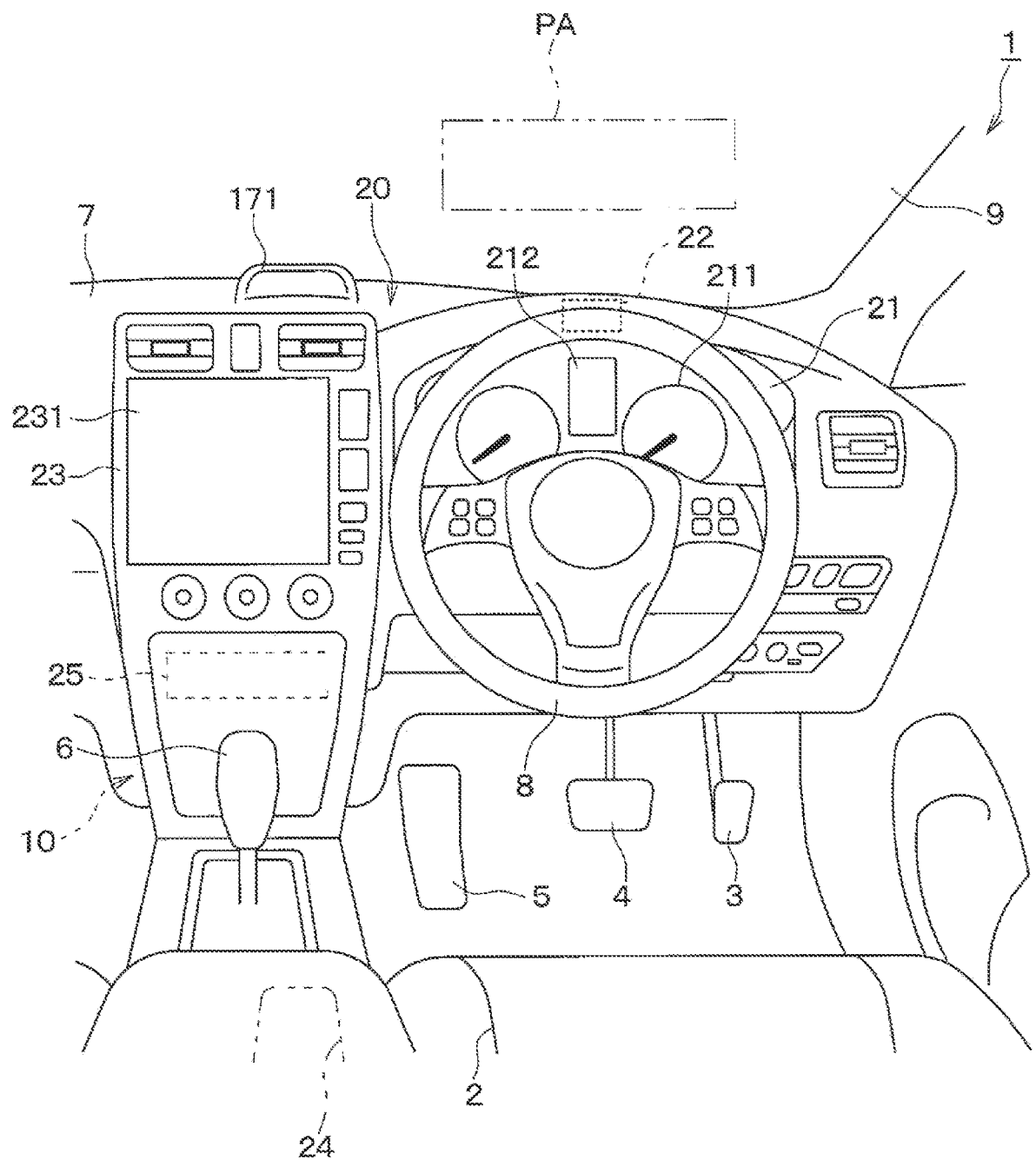
FIG. 1 is a schematic external view illustrating a vehicle compartment of a vehicle mounted with an in-vehicle system including the driving control device and the HMI control device.

To begin with, a relevant technology will be described first only for understanding the following embodiments. The automated driving may terminate at the end of a specified road section where the automated driving is permitted, for example. When the automated driving terminates, it is necessary to transfer the control to the driver in terms of vehicle motion control and/or operation environment monitoring.

When performing the second task during automated driving, the driver is unconscious of the subject vehicle's operation condition and environment. The driver needs to successfully enhance the awareness concerning the termination of automated driving to smoothly transfer the control. The present disclosure has been made in consideration of the foregoing. It is therefore an objective of the disclosure to provide a technology that can successfully enhance the driver's awareness concerning the transition between autonomous driving levels due to the termination of automated driving, for example.

As described above, the one aspect of the present disclosure is an HMI control device configured to control an HMI device that displays an image visibly recognized by a driver of a vehicle. The vehicle is capable of performing automated driving. The HMI control device includes: an automation level acquisition portion that is configured to acquire an autonomous driving level determined by a driving control device that is configured to control an operation of the vehicle; and a display control portion that is configured to control an image display operation of the HMI device according to the autonomous driving level acquired by the automation level acquisition portion. When terminating a high autonomous driving level as the autonomous driving level under the automated driving, the display control portion is configured to control the HMI device to provide an action instruction display that instructs the driver to take a low-level associated state as a driver state so as to handle a low autonomous driving level. The low autonomous driving level is lower than the high autonomous driving level.

A second aspect of the present disclosure is a driving control device configured to control an operation of a vehicle capable of performing automated driving. The driving control device includes: a traveling situation acquisition portion that is configured to acquire a traveling situation of the vehicle; and an automation level determining portion that is configured to determine an autonomous driving level based on the traveling situation acquired by the traveling situation acquisition portion. The automation level determining portion is configured to: terminate a high autonomous driving level as the autonomous driving level under the automated driving; temporarily transition to a low autonomous driving level as the autonomous driving level lower than a middle autonomous level; and then transition to the middle autonomous level as the autonomous driving level lower than the high autonomous driving level.

A third aspect of the present disclosure is an HMI control device configured to control an HMI device that displays an image visibly recognized by a driver of a vehicle. The vehicle is capable of performing automated driving. The HMI control device includes: at least one processor; and at least one memory storing a program that comprises instructions, when executed by the at least one processor, causing the at least one processor to: acquire an autonomous driving level determined by a driving control device that is configured to control an operation of the vehicle; control an image display operation of the HMI device according to the acquired autonomous driving level; and when terminating a high autonomous driving level as the autonomous driving level under the automated driving, control the HMI device to provide an action instruction display that instructs the driver to take a low-level associated state as a driver state so as to handle a low autonomous driving level. The low autonomous driving level is the autonomous driving level lower than the high autonomous driving level.

A fourth aspect of the present disclosure is a driving control device configured to control an operation of a vehicle capable of performing automated driving. The driving control device includes: at least one processor; and at least one memory storing a program that comprises instructions, when executed by the at least one processor, causing the at least one processor to: acquire a traveling situation of the vehicle; determine an autonomous driving level based on the acquired traveling situation; terminate a high autonomous driving level as the autonomous driving level under the automated driving; temporarily transition to a low autonomous driving level as the autonomous driving level lower than a middle autonomous level; and then transition to the middle autonomous level as the autonomous driving level lower than the high autonomous driving level.

EMBODIMENTS

The description below explains embodiments of the present disclosure by reference to the accompanying drawings. Various modifications may be applicable to one embodiment. However, the understanding of the embodiment may be hindered if the description of a modification is inserted in the middle of the successive description of the embodiment. Therefore, modifications will be described collectively after the successive description of the embodiment, not in the middle thereof.

First Embodiment: Configuration

With reference to FIG. 1, a vehicle 1 is a so-called normal passenger vehicle and includes multiple occupant seats such as a driver's seat 2 in a vehicle compartment as the internal space of a box-shaped vehicle body. A "driver" is hereinafter defined as an occupant in the driver's seat 2. "Front" is hereinafter defined as the direction of the driver's visual line when the driver takes a normal driving posture in the driver's seat 2. The "normal driving posture" is defined as the driver's posture when the driver is properly seated in the driver's seat 2 to be capable of manual operation by keeping a line connecting both eyes approximately parallel to a line connecting both shoulders while the vehicle 1 travels straight forward.

An accelerator pedal 3, a brake pedal 4, and a footrest 5 are provided in front of the driver's seat 2. A shift lever 6 is provided diagonally in front of the driver's seat 2. The accelerator pedal 3, the brake pedal 4, and the footrest 5 are positioned below a dashboard 7 provided in front of the driver's seat 2. A steering wheel 8 is attached to a steering column (not shown) extending rearward from the dashboard 7 toward the driver's seat 2. A front windshield 9 is provided above the dashboard 7.

Figure 2:
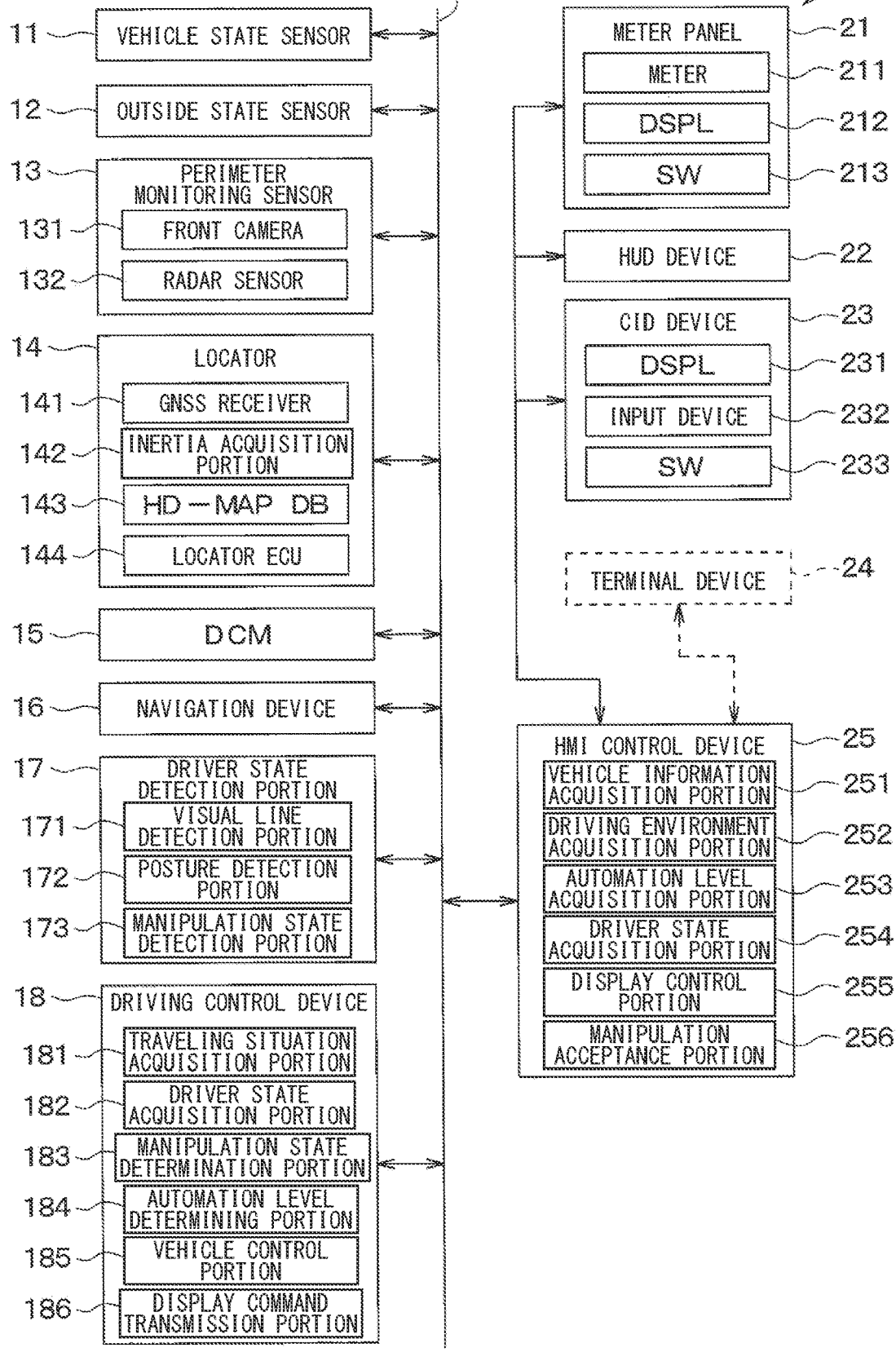
FIG. 2 is a block diagram illustrating a schematic configuration of the in-vehicle system illustrated in FIG. 1.

The vehicle 1 includes an in-vehicle system 10. A "subject vehicle" may be hereinafter defined as the vehicle 1 including the in-vehicle system 10. FIG. 2 schematically illustrates a block configuration of the in-vehicle system 10. By reference to FIGS. 1 and 2, the description below explains the schematic configuration of the in-vehicle system 10.

The in-vehicle system 10 is installed in the subject vehicle to function as an operations automation system in the subject vehicle. According to the present embodiment, the in-vehicle system 10 is configured to be capable of automated driving. Installation of the in-vehicle system 10 enables the subject vehicle to be capable of automated driving.

The "automated driving" signifies autonomous driving levels that correspond to levels 3 through 5 in the standard "SAE J3016" published by SAE International and allow the operations automation system to handle or perform all dynamic operation tasks. SAE stands for Society of Automotive Engineers. The "dynamic operation task" signifies all operational and strategic functions, except the strategic functions, that need to be performed in real time to operate the vehicle 1 in road traffic. The "strategic functions" include itinerary scheduling and waypoint selection, for example. Level X in "SAE J3016" is hereinafter simply denoted as "level X." X corresponds to one of 0 through 5. In the description below, a "higher autonomous driving level" signifies an increased numeric value of X or an increased number of dynamic operation tasks handled or performed by the operations automation system. Contrastingly, a "lower autonomous driving level" signifies a decreased numeric value of X or a decreased number of dynamic operation tasks handled or performed by the operations automation system.

The specific contents of levels 0 through 5 in "SAE J3016" are described below. Names corresponding to the autonomous driving levels are not described in "SAE J3016," but are used for descriptive purposes in the present specification. In the following description of the levels, "OEDR" stands for Object and Event Detection and Response. OEDR includes operation environment monitoring. The operation environment monitoring includes detection, recognition, and classification of objects and events. The operation environment monitoring also includes preparations for responses to objects and events as needed. A "definite domain" is defined as a specific condition designed to operate a certain operations automation system or its function and is also denoted as an Operational Design Domain (ODD). The definite domain includes at least one of multiple constraint conditions in terms of geography, environment, speed, and time.

Level 0: Manual operation . . . The driver performs all dynamic operation tasks.

Level 1: Operation support . . . The operations automation system continuously performs one of a vertical vehicle motion control subtask and a horizontal vehicle motion control subtask belonging to the dynamic operation task in a specific definite domain. The vertical vehicle motion control subtask concerns start, acceleration/deceleration, and stop. The horizontal vehicle motion control subtask concerns steering. The operations automation system does not simultaneously perform both the vertical vehicle motion control subtask and the horizontal vehicle motion control subtask.

Level 2: Advanced operation support . . . The operations automation system continuously performs the vertical vehicle motion control subtask and the horizontal vehicle motion control subtask belonging to the dynamic operation task in a specific definite domain. The driver is expected to perform OEDR as a subtask of the dynamic operation task to control the operations automation system.

Level 3: Conditional automated driving . . . The operations automation system continuously performs all dynamic operation tasks in a particular definite domain. In principle, the driver is not responsible for OEDR such as monitoring around the subject vehicle. However, the operations automation system requests the driver to take over driving with time to spare when it is difficult to continue the autonomous driving level. The driver needs to appropriately respond to the request.

Level 4: Advanced automated driving . . . The operations automation system continuously performs all dynamic operation tasks in a particular definite domain. The operations automation system takes action against a case where it is difficult to continue the autonomous driving level in the definite domain.

Level 5: Fully automated driving . . . The operations automation system unlimitedly and continuously performs all dynamic operation tasks without limitation to a specific definite domain. The operations automation system unlimitedly takes action against a case where it is difficult to continue the autonomous driving level without limitation to a specific definite domain.

According to the present embodiment, the in-vehicle system 10 is configured to enable the subject vehicle to provide levels 0 through 3 as autonomous driving levels. Specifically, the in-vehicle system 10 is configured to be capable of ACC and LKA corresponding to level 1. ACC stands for Adaptive Cruise Control and provides control over inter-vehicle distances. LKA stands for Lane Keeping Assistance and provides control over an assist in lane keeping. The in-vehicle system 10 is configured to be capable of "hands-off operation" and "advanced safe driving assist" corresponding to level 2. The "hands-off operation" means that the operations automation system automatically controls start, steering, acceleration/deceleration, and stop on the condition that the driver appropriately responds to interrupt requests from the operations automation system, for example. The "advanced safe driving assist" signifies that the parallel active operations automation system timely performs driving assistance operations in the case of a possible collision, for example, on the assumption that the driver operates the subject vehicle. Unless otherwise specified, the level-3 automated driving is simply denoted as "automated driving" in the following description of the present specification. The "hands-off operation" may be simply denoted as "level 2." The "advanced safe driving assist" is denoted as "level 2 [G mode]."

Overall System Configuration

As illustrated in FIG. 2, the in-vehicle system 10 provides an onboard network including an onboard communication line 10A and multiple nodes mutually connected via the onboard communication line 10A. The in-vehicle system 10 is capable of various vehicle controls during travel of the subject vehicle and various related display operations. The in-vehicle system 10 is configured to comply with specified communication standards such as CAN (international registered trademark: international registration No. 1048262A). CAN stands for Controller Area Network.

The in-vehicle system 10 includes a vehicle state sensor 11, an outside state sensor 12, a perimeter monitoring sensor 13, a locator 14, a DCM 15, a navigation device 16, a driver state detection portion 17, a driving control device 18, and an HMI device 20. DCM stands for Data Communication Module. The vehicle state sensor 11 through the HMI device 20 are connected to the onboard communication line 10A.

The HMI device 20 displays images and outputs sound so that subject vehicle occupant including at least the driver can view images and listen to the audio. Specifically, the HMI device 20 provides subject vehicle occupants with a variety of information and/or entertainment through the use of audiovisual input/output devices including a meter panel 21, a HUD device 22, a CID device 23, and a terminal device 24.

CID stands for Center Information Display. HUD stands for Head-Up Display. The terminal device 24 is a portable or wearable electronic device brought into the subject vehicle by a subject vehicle occupant including the driver. For example, the terminal device 24 includes a mobile phone, a tablet terminal, a laptop computer, a portable game machine, and a smartwatch.

The HMI device 20 includes an HMI control device 25 to control audiovisual output to the meter panel 21, for example. The HMI control device 25 controls operations of the HMI device 20 that provides an interior infotainment system. The meter panel 21, the HUD device 22, and the CID device 23 are connected to the HMI control device 25 via a sub-communication line different from the onboard communication line 10A to be capable of information communication. The terminal device 24, when brought into the subject vehicle, connects with the HMI control device 25 to be capable of information communication based on the near field communication such as Bluetooth (registered trademark) and TransferJet (registered trademark). The HMI control device 25 is provided as a node connected to the onboard communication line 10A. Detailed configurations of the HMI device 20 and the HMI control device 25 will be described later.

Various Sensors

The vehicle state sensor 11 produces outputs corresponding to quantities related to the operation states of the subject vehicle. The "quantities related to operation states" include, for example, accelerator opening, braking amount, shift positions, and steering angles, namely, quantities related to driving manipulation states caused by the driver or the operations automation system. The "quantities related to the operation state" also include, for example, vehicle speed, angular velocity, longitudinal acceleration, and horizontal acceleration, namely, physical quantities related to the behavior of the subject vehicle. The vehicle state sensor 11 is a generic term used to denote well-known sensors necessary for vehicle driving control, for simplification of the illustration and the description, and represents accelerator opening sensor, steering angle sensor, wheel speed sensor, angle speed sensor, and acceleration sensor, for example. The vehicle state sensor 11 is provided to be able to provide detection output to each component such as the driving control device 18 via the onboard communication line 10A.

The outside state sensor 12 produces outputs corresponding to quantities mainly related to natural environments belonging to the operation environments of the subject vehicle. The "quantities related to natural environments" include physical quantities such as outside air temperature, rainfall, and illuminance, for example. The outside state sensor 12 is a generic term used to denote well-known sensors such as outside air temperature sensor, raindrop sensor, and illuminance sensor, for simplification of the illustration and the description. The outside state sensor 12 is provided to be able to provide detection output to each component such as the driving control device 18 via the onboard communication line 10A.

The perimeter monitoring sensor 13 mainly detects the subject vehicle's operation environments other than the ones the outside state sensor 12 can detect. Specifically, the perimeter monitoring sensor 13 can detect moving and stationary objects within a predetermined detection range around the subject vehicle. The "moving objects" include pedestrians, cyclists, animals, and other vehicles in operation. The "stationary objects" include roadside structures (such as walls and buildings) in addition to fallen objects on the road, guardrails, curbs, parked vehicles, road signs, and road signs. The perimeter monitoring sensor 13 can also be denoted as an "ADAS sensor." ADAS stands for Advanced Driver-Assistance Systems.

According to the present embodiment, the perimeter monitoring sensor 13 includes a front camera 131 and a radar sensor 132 to detect moving objects and stationary objects. The front camera 131 captures images in front of and to the front side of the subject vehicle. The front camera 131 is a digital camera device and includes an image sensor such as CCD or CMOS. CCD stands for Charge Coupled Device. CMOS stands for Complementary MOS.

The radar sensor 132 represents a millimeter-wave radar sensor, a submillimeter-wave radar sensor, or a laser radar sensor that transmits and receives radar waves. The radar sensor 132 is mounted on the front face of the vehicle body of the subject vehicle. The radar sensor 132 outputs a signal corresponding to the position and relative speed of a reflection point. The "reflection point" is assumed to be located on the face of an object existing around the subject vehicle and to have reflected radar waves. The "relative speed" is relative to the subject vehicle and applies to an object reflecting the radar wave at the reflection point.

Locator

The locator 14 uses so-called complex positioning to acquire highly accurate location information about the subject vehicle. Specifically, the locator 14 includes a GNSS receiver 141, an inertia acquisition portion 142, a high-precision map DB 143, and a locator ECU 144. GNSS stands for Global Navigation Satellite System. DB stands for a database. ECU stands for an electronic control unit. The "highly accurate location information" can be used for the autonomous driving levels comparable to level 2 or higher, for example, and specifically ensures a location accuracy high enough to allow an error of less than 10 cm.

The GNSS receiver 141 receives positioning signals transmitted from multiple positioning satellites or artificial satellites. According to the present embodiment, the GNSS receiver 141 can receive positioning signals from positioning satellites in at least one of the satellite positioning systems such as GPS, QZSS, GLONASS, Galileo, IRNSS, and BeiDou Navigation Satellite System. GPS stands for Global Positioning System. QZSS stands for Quasi-Zenith Satellite System. GLONASS stands for Global Navigation Satellite System. IRNSS stands for Indian Regional Navigation Satellite System.

The inertia acquisition portion 142 acquires accelerations and angular velocities acting on the subject vehicle. According to the present embodiment, the inertia acquisition portion 142 is provided as a 3-axis gyro sensor and a 3-axis acceleration sensor built in a box-shaped housing in the locator 14.

The high-precision map DB 143 is mainly composed of non-volatile rewritable memory so that high-precision map information can be stored to be rewritable and the stored contents can be retained even when the power is turned off. The non-volatile rewritable memory represents a hard disk, EEPROM, or flash ROM, for example. EEPROM stands for Electronically Erasable and Programmable ROM. ROM stands for Read-Only Memory. The high-precision map information can also be denoted as high-precision map data. The high-precision map information is more accurate than the map information used for conventional car navigation systems that allow a location error of several meters. The high-precision map DB 143 stores, for example, three-dimensional road shape information, lane count information, and regulation information, namely, the information available for the autonomous driving levels corresponding to level 2 or higher in compliance with specified standards such as the ADASIS standard. ADASIS stands for Advanced Driver Assistance Systems Interface Specification.

The locator ECU 144 is configured as a so-called onboard microprocessor including a not-shown CPU, ROM, RAM, and input/output interface, for example. CPU stands for Central Processing Unit. RAM stands for Random Access Memory. The locator ECU 144 successively settles locations and directions of the subject vehicle based on positioning signals received by the GNSS receiver 141, accelerations and angular velocities acquired by the inertia acquisition portion 142, and vehicle speeds acquired from the vehicle state sensor 11, for example. The locator 14 can provide the resultant locations and directions settled by the locator ECU 144 for the components such as the navigation device 16, the driving control device 18, and the HMI control device 25 via the onboard communication line 10A.

DCM

The DCM 15 is an onboard communication module and is capable of information communication with base stations around the subject vehicle through the use of wireless communications compliant with communication standards such as LTE or 5G. LTE stands for Long Term Evolution. 5G stands for 5th Generation.

For example, the DCM 15 acquires the latest high-precision map information from a cloud-based probe server. The DCM 15 stores the latest acquired high-precision map information in the high-precision map DB 143 in cooperation with the locator ECU 144. Moreover, the DCM 15 acquires traffic information such as congestion information from the above-described probe server and/or a predetermined database. The "congestion information" includes the location and length of a congested section. Specifically, the congestion information includes the beginning and the end of congestion, an estimated congestion distance, and an estimated congestion time, for example. The traffic information is also denoted as "road traffic information."

Navigation Device

The navigation device 16 acquires a scheduled travel route from the current location of the subject vehicle to a predetermined destination. According to the present embodiment, the navigation device 16 calculates the scheduled travel route based on the destination settled by the driver of the subject vehicle, the high-precision map information acquired from the locator 14, and the location information and direction information about the subject vehicle acquired from the locator 14. The navigation device 16 can provide various information including the route information as calculation results for the components such as the driving control device 18 and the HMI control device 25 via the onboard communication line 10A. The navigation device 16 allows the HMI device 20 to display navigation screens so that the map and routes can be displayed.

Driver State Detection Portion

The driver state detection portion 17 detects a driver state. The "driver state" indicates the state of a driver sitting in the driver's seat 2 of the subject vehicle and includes at least one of the visual line direction, posture, behavior, and psychological state, for example. The driver state detection portion 17 can provide the driver state as detection results for the components such as the driving control device 18 and the HMI control device 25 via the onboard communication line 10A.

According to the present embodiment, the driver state detection portion 17 includes a visual line detection portion 171, a posture detection portion 172, and a manipulation state detection portion 173. The visual line detection portion 171 detects the driver's face orientation and/or visual line direction according to the image recognition based on images captured by an interior camera including an image sensor such as CCD or CMOS. The visual line detection portion 171 is configured similarly to a DSM device that gives a warning regarding the driver's inattentive driving. DSM stands for Driver Status Monitor.

The posture detection portion 172 detects the sitting posture of the driver in the driver's seat 2 through the use of the above-described interior camera and/or a physical quantity sensor such as a seating pressure sensor provided inside the driver's seat 2. The manipulation state detection portion 173 detects states of the driver's foot placed on the accelerator pedal 3, the brake pedal 4, and the footrest 5 as well as states of operating the accelerator pedal 3 and the brake pedal 4. The manipulation state detection portion 173 detects states of the steering wheel 8 gripped and operated by the driver.

Driving Control Device

The driving control device 18 is configured as an "automated driving ECU" or a "driving assist ECU." The driving control device 18 controls operations of the subject vehicle based on signals and information acquired from the vehicle state sensor 11, the outside state sensor 12, the perimeter monitoring sensor 13, and the locator 14, for example. Specifically, the driving control device 18 performs a predetermined driving control operation. According to the present embodiment, the "predetermined operation control operation" includes a vehicle control operation, namely, an operation to implement the dynamic operation tasks corresponding to levels 1 through 3. According to the present embodiment, the driving control device 18 can set the autonomous driving level for the subject vehicle to one of level 0, level 1 [ACC], level 1 [LKA], level 2, level 2 [G mode], and level 3.

The driving control device 18 is configured as a so-called onboard microcomputer including an unillustrated CPU, ROM, non-volatile rewritable memory, RAM, and input/output interface, for example. The driving control device 18 includes the following functional configurations or functional portions implemented on the onboard microcomputer. Namely, the driving control device 18 includes a traveling situation acquisition portion 181, a driver state acquisition portion 182, a manipulation state determination portion 183, an automation level determining portion 184, a vehicle control portion 185, and a display command transmission portion 186.

The traveling situation acquisition portion 181 acquires at least a traveling situation of the subject vehicle. The "traveling situation" includes operation states and operation environments detected or acquired by the vehicle state sensor 11, the outside state sensor 12, and the perimeter monitoring sensor 13, for example. The traveling situation acquisition portion 181 acquires the current position of the subject vehicle, nearby high-precision map information, and traffic information on the road where the subject vehicle is currently traveling. The traveling situation acquisition portion 181 acquires the information necessary for vehicle control corresponding to levels 1 through 3 from the vehicle state sensor 11, the outside state sensor 12, the perimeter monitoring sensor 13, the locator 14, and the DCM 15, for example.

The driver state acquisition portion 182 acquires driver states. Specifically, the driver state acquisition portion 182 acquires or receives results of the driver states detected by the driver state detection portion 17 from the driver state detection portion 17.

The manipulation state determination portion 183 determines a driving manipulation state caused by the driver. Specifically, the manipulation state determination portion 183 acquires or receives detection results in the manipulation state detection portion 173 from the driver state detection portion 17. The manipulation state determination portion 183 acquires or receives an input manipulation state caused by the driver on the HMI device 20 from the HMI device 20. The manipulation state determination portion 183 determines the driving manipulation state caused by the driver based on the acquired results.

The automation level determining portion 184 settles the autonomous driving level based on the traveling situation acquired by the traveling situation acquisition portion 181, for example. The driving control device 18 can provide a result of the autonomous driving level settled by the automation level determining portion 184 for the components such as the HMI control device 25 via the onboard communication line 10A. The automation level determining portion 184 to settle the autonomous driving level will be described in detail later in the operation outline and the description of operation examples.

The vehicle control portion 185 executes the vehicle motion control subtask corresponding to the autonomous driving level. The vehicle control portion 185 controls longitudinal and/or lateral motions of the subject vehicle based on the autonomous driving level settled by the automation level determining portion 184.

The display command transmission portion 186 transmits display command information to the HMI control device 25 that controls the HMI device 20, thereby allowing the HMI device 20 to provide level-related displays associated with the autonomous driving levels. The level-related displays include an implementation-related display associated with the implementation state of autonomous driving levels and a transition-related display associated with the transition of autonomous driving levels. The implementation-related display explicitly indicates the active autonomous driving level in the form of "automated driving in progress," for example. The transition-related display is used for transition to another autonomous driving level when the active autonomous driving level satisfies an end condition or does not satisfy a continuation condition. The transition-related display relates to the end of the active autonomous driving level and/or the transition to another autonomous driving level. The transition-related display provides "automated driving will end 3 km ahead," "prepare for driving changeover," and "hands-off operation enabled," for example. The implementation-related display and the transition-related display as well as other examples will be described in more detail later in the operation outline and the description of operation examples.

HMI Device

The HMI device 20 at least visually provides the driver with various information about the subject vehicle and accepts the driver's input operation corresponding to the provided content. According to the present embodiment, the HMI device 20 is installed in the subject vehicle capable of automated driving and can provide various information related to the automated driving and accept the driver's input operations. The "information provision" includes various types of guidance, input operation instructions, notification of the input operation content, and warnings, for example.

As above, the HMI device 20 includes the meter panel 21, the HUD device 22, and the CID device 23 provided for the dashboard 7. According to the present embodiment, the HMI device 20 is configured as a so-called "dashboard HMI." The HMI device 20 also includes a speaker (not shown) to audibly provide information.

The meter panel 21 includes a meter 211, a meter display 212, and a meter switch 213. The meter 211 provides meter indications such as subject vehicle speed, engine speed, cooling water temperature, and fuel level, for example. The meter display 212 corresponds to an information display portion or an information display area provided at the center of the meter panel 21 in the vehicle width direction. The meter display 212 can display various information such as date and time, outside temperature, mileage, and radio stations, for example. According to the present embodiment, the meter display 212 is configured as a display device comparable to a liquid crystal display or an organic EL display and includes an approximately rectangular displayable area. EL stands for Electroluminescence. The meter switch 213 can accept various operations such as resetting a trip meter related to display states or contents on the meter 211 and/or the meter display 212.

The HUD device 22 displays visual images including characters and/or symbols in front of the driver. The HUD device 22 uses AR technology to form virtual images in front of the driver and thereby superimposedly displays a visual image in the foreground including the road surface ahead of the traveling subject vehicle. The "superimposing display" signifies displaying related information (such as a building name) over or near a superimposed object (such as a building) included in the foreground so that the superimposed object and the related information can be displayed in association with each other. The "superimposing display" also applies to route display, travel direction display, and traffic information display concerning the road surface ahead, for example. Specifically, the HUD device 22 projects the visual image light constituting the visual image onto a predetermined projection range PA in the front windshield 9. The HUD device 22 thereby allows the driver to view the reflected light, namely, the visual image light reflecting off the front windshield 9 so that the visual image can be displayed as an AR display.

The CID device 23 is provided at approximately the center of the dashboard 7 in the vehicle width direction. The CID device 23 enables the navigation device 16 to display a navigation display screen that displays a map or routes, for example. The CID device 23 can also display information and contents different from the navigation display screen. Specifically, the CID device 23 can provides displays concerning travel modes such as "comfort," "normal," "sports," and "circuit," for example.

The CID device 23 can provide displays concerning the second task available to the driver during automated driving. The CID device 23 can audiovisually provide a video content as the second task, for example. The "video content" includes movies, concert videos, music videos, and television broadcasts, for example. The second task also includes manipulations of the terminal device 24.

The CID device 23 includes a CID display 231, an input device 232, and a CID switch 233. The CID display 231 is provided at least to be visible from the driver at approximately the center of the dashboard 7 in the vehicle width direction, namely, between the driver's seat 2 and the passenger seat. The CID display 231 is configured as a display device comparable to a liquid crystal display or an organic EL display. When the second task is video content viewing, the CID display 231 allows a display device to display videos in the video content.

The input device 232 is a transparent touch panel and is overlaid on the CID display 231 to cover the CID display 231. The input device 232 can allow the driver, for example, to view the content on the CID display 231 and accept an input manipulation by the driver, for example, corresponding to the content. The CID switch 233 includes multiple manual operation switches placed around the CID display 231 and the input device 232.

The HMI device 20 includes a steering switch, for example, in addition to the meter switch 213 and the CID switch 233. The steering switch is provided for a spoke portion of the steering wheel 8, for example. The HMI device 20 can provide a result of accepting the driver's input operation for the components such as the driving control device 18 via the onboard communication line 10A.

HMI Control Device

The HMI control device 25 is configured as an HCU that controls operations of the meter panel 21, the CID device 23, and the HUD device 22, for example, included in the HMI device 20. HCU stands for HMI Control Unit.

The HMI control device 25 is configured as a so-called onboard microcomputer including an unshown CPU, ROM, non-volatile rewritable memory, RAM, and input/output interface, for example. The HMI control device 25 includes the following functional configurations or functional portions implemented on an onboard microcomputer. Namely, the HMI control device 25 includes a vehicle information acquisition portion 251, a driving environment acquisition portion 252, an automation level acquisition portion 253, a driver state acquisition portion 254, a display control portion 255, and a manipulation acceptance portion 256.

The vehicle information acquisition portion 251 acquires information related to the operation states of the subject vehicle. Specifically, the vehicle information acquisition portion 251 acquires various quantities related to the operation states of the subject vehicle from the vehicle state sensor 11 that detects or acquires the quantities.

The driving environment acquisition portion 252 acquires information related to the operation environment of the subject vehicle. Specifically, the driving environment acquisition portion 252 acquires various quantities related to the natural environment around the subject vehicle from the outside state sensor 12 that detects or acquires the quantities. The driving environment acquisition portion 252 acquires resultant objects detected by the perimeter monitoring sensor 13 from the perimeter monitoring sensor 13. Moreover, the driving environment acquisition portion 252 acquires the following from the locator 14 and the navigation device 16: the current position of the subject vehicle, the scheduled travel route, and the traffic information including the traffic congestion information on the scheduled travel route.

The automation level acquisition portion 253 acquires a resultant autonomous driving level settled in the driving control device 18. Specifically, the automation level acquisition portion 253 acquires the resultant autonomous driving level settled by the automation level determining portion 184 from the driving control device 18.

The driver state acquisition portion 254 acquires driver states. Specifically, the driver state acquisition portion 254 acquires the resultant driver state detected by the driver state detection portion 17 from the driver state detection portion 17.

The display control portion 255 controls the HMI device 20 to output images and/or audio. Namely, the display control portion 255 controls the meter panel 21, the HUD device 22, and the CID device 23, for example, to output images and audio, thereby providing various information for subject vehicle occupants including the driver. The "various information" includes operation state information, operation environment information, information related to autonomous driving levels, route information, traffic congestion information, and various messages, for example. The display control portion 255 interacts with the terminal device 24 during the second task performed by the driver using the terminal device 24 so that the terminal device 24 can provide various information.

According to the present embodiment, the display control portion 255 controls the HMI device 20 to display images according to the autonomous driving level acquired by the automation level acquisition portion 253. Namely, the display control portion 255 displays images corresponding to the autonomous driving level on an image display device such as the meter panel 21 included in the HMI device 20 under the condition that the autonomous driving level is determined by the automation level determining portion 184 and is being or is to be implemented by the in-vehicle system 10.

The manipulation acceptance portion 256 accepts input operations performed by subject vehicle occupants including the driver on the HMI device 20. Specifically, the manipulation acceptance portion 256 monitors states or results of accepting input operations on the meter switch 213, the input device 232, the CID switch 233, and the terminal device 24, for example, corresponding to various information provided by the display control portion 255.

Operation Outline

The description below explains the operations of the driving control device 18 and the HMI control device 25 according to the present embodiment and the outline of control methods and control programs executed by these as well as effects provided by the present embodiment.

In the driving control device 18, the traveling situation acquisition portion 181 acquires various information including traveling situations of the subject vehicle. Specifically, the traveling situation acquisition portion 181 acquires the subject vehicle's operation states and operation environments from the vehicle state sensor 11, the outside state sensor 12, and the perimeter monitoring sensor 13. Moreover, the traveling situation acquisition portion 181 acquires the following from the locator 14 and the navigation device 16: high-precision map information about the current position of the subject vehicle and its surroundings, a scheduled travel route, and traffic information on the scheduled travel route.

The driver state acquisition portion 182 acquires driver states. Specifically, the driver state acquisition portion 182 receives resultant driver states detected by the driver state detection portion 17 from the driver state detection portion 17.

The manipulation state determination portion 183 determines the driver's driving manipulation states. Specifically, the manipulation state determination portion 183 acquires results detected by the manipulation state detection portion 173 from the driver state detection portion 17. The results detected by the manipulation state detection portion 173 include states of placing the driver's foot on the accelerator pedal 3, the brake pedal 4, or the footrest 5, states of operating the accelerator pedal 3 or the brake pedal 4, and states of holding or operating the steering wheel 8, for example. The manipulation state determination portion 183 acquires states of the driver's input manipulation on the HMI device 20 from the HMI device 20. The manipulation state determination portion 183 determines the driver's driving manipulation state based on the detection result in the manipulation state detection portion 173 and the state of the driver's input manipulation on the HMI device 20.

The automation level determining portion 184 settles the autonomous driving level to be implemented by the in-vehicle system 10. The autonomous driving level is settled at least based on the traveling situation acquired by the traveling situation acquisition portion 181. According to the present embodiment, the automation level determining portion 184 settles the autonomous driving level based on results acquired by the traveling situation acquisition portion 181 and the driver state acquisition portion 182, and the determination result from the manipulation state determination portion 183.

Specifically, the automation level determining portion 184 settles conditions to start autonomous driving levels corresponding to levels 1 through 3 based on various information such as traveling situations acquired by the traveling situation acquisition portion 181. When the condition to start a specific autonomous driving level is satisfied, the automation level determining portion 184 determines that the autonomous driving level is available. When the driver performs an approval operation, the automation level determining portion 184 settles the implementation of the autonomous driving level. The vehicle control portion 185 provides vehicle speed control, steering control, or braking control, for example, according to the autonomous driving level settled by the automation level determining portion 184.

The display command transmission portion 186 transmits display command information to the HMI control device 25 controlling the HMI device 20 and thereby allows the HMI device 20 to provide a level-related display related to the autonomous driving level. The HMI device 20 then audio-visually notifies subject vehicle occupants including the driver of the autonomous driving level being or to be implemented. Specifically, the HMI device 20 allows the meter display 212, for example, to display the currently active autonomous driving level. When the automated driving is available, the HMI device 20 allows the meter display 212, for example, to display the availability of the automated driving and an approval operation instruction to accept the approval operation for starting the automated driving.

During automated driving, the driver is not obliged to monitor the circumference of the subject vehicle until the in-vehicle system 10 generates a driving changeover request or a driving interrupt request. In principle, the driver is not requested to perform a steering control operation or an acceleration/deceleration control operation until a driving changeover request or a driving interrupt request occurs.

During automated driving, the driver is not requested to take a manual driving attitude, namely, a driving attitude capable of manual operation. The "driving attitude" includes driving posture and driving awareness. The "driving posture" signifies the driver's seating posture and includes the sitting posture in the driver's seat 2, the positional relationship of the foot and the accelerator pedal 3, the state of holding or operating the steering wheel 8, and the visual line direction, for example. The "driving awareness" signifies the driver's psychological state and includes states of recognizing the operation state and the operation environment of the subject vehicle. The visual line direction can also be included in the "driving awareness." Hereinafter, an "increased driving awareness" signifies a higher level of driver's state to pay attention to or monitor the operation state and the operation environment of the subject vehicle and ensures a driving awareness level capable of responding to lower autonomous driving levels. Contrastingly, a decreased driving awareness signifies the driver's awareness distracted from driving.

The driver is not requested to always hold the steering wheel 8 while no driving changeover request or driving interrupt request occurs and the in-vehicle system 10 is stably providing automated driving. The driver is also not requested to always maintain a driving posture capable of operating the accelerator pedal 3 and the brake pedal 4 at any time. Moreover, the driver's awareness may be distracted from the subject vehicle's operation state and operation environment until the in-vehicle system 10 generates a driving changeover request or a driving interrupt request. The driver can freely perform or use the second task while the in-vehicle system 10 is stably providing automated driving.

Figure 3:
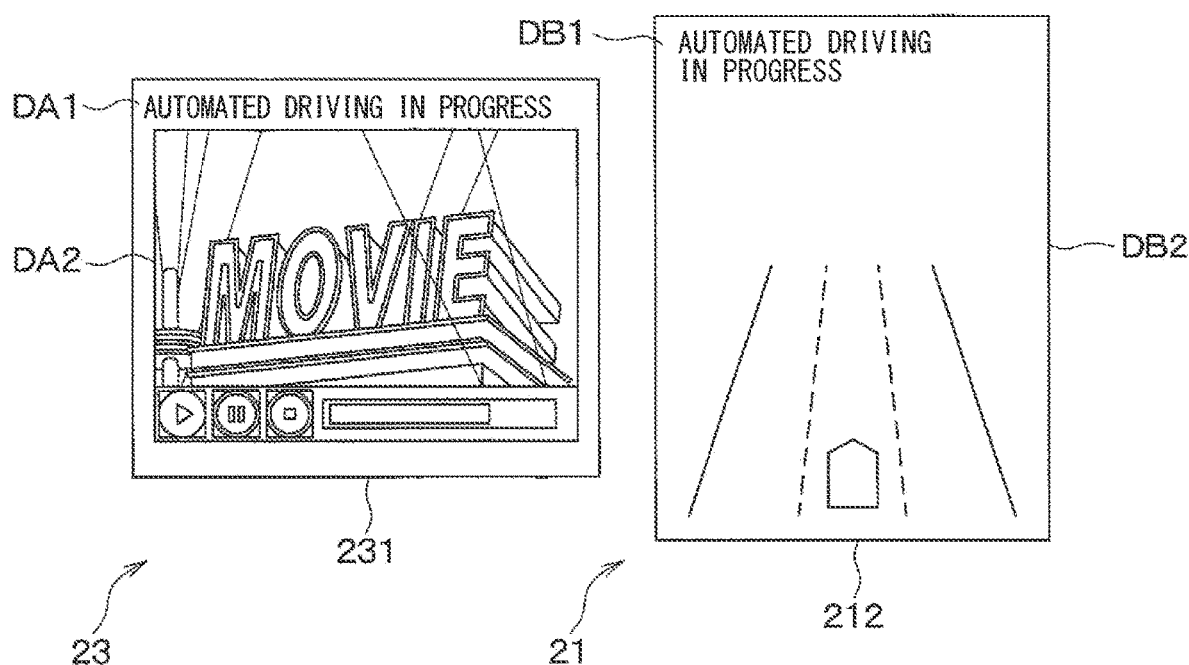
FIG. 3 is a schematic diagram illustrating a display on the HMI device according to a first embodiment.

FIG. 3 illustrates a typical display example on the CID display 231 and the meter display 212 while the CID device 23 provides video content as the second task during the automated driving. An information display area DA1, a horizontally long strip-shaped area at the upper end of the CID display 231, provides an implementation-related display "automated driving in progress" to indicate the active autonomous driving level. A screen area DA2 is positioned below the information display area DA1 and occupies most of the displayable area on the CID display 231. The screen area DA2 displays the video content screen as a second task screen.

A level information display area DB1, a horizontally long strip-shaped area at the upper end of the meter display 212, provides an implementation-related display "automated driving in progress" to indicate the active autonomous driving level. A driving information display area DB2 is positioned below the level information display area DB1 and occupies most of the displayable area on the meter display 212. The driving information display area DB2 displays various information such as a lane being traveled by the subject vehicle during automated driving.

The active autonomous driving level may satisfy the end condition or may not satisfy the continuation condition. In such a case, the automation level determining portion 184 settles the transition of autonomous driving levels. Namely, the automation level determining portion 184 terminates the active autonomous driving level and settles a next feasible autonomous driving level.

Then, the vehicle control portion 185 provides vehicle speed control, steering control, or braking control, for example, according to the mode of changing the autonomous driving level determined by the automation level determining portion 184. The display command transmission portion 186 transmits display command information to the HMI control device 25 and thereby allows the HMI device 20 to provide the transition-related display concerning the transition of the autonomous driving level.

Operation Examples

Figure 4:
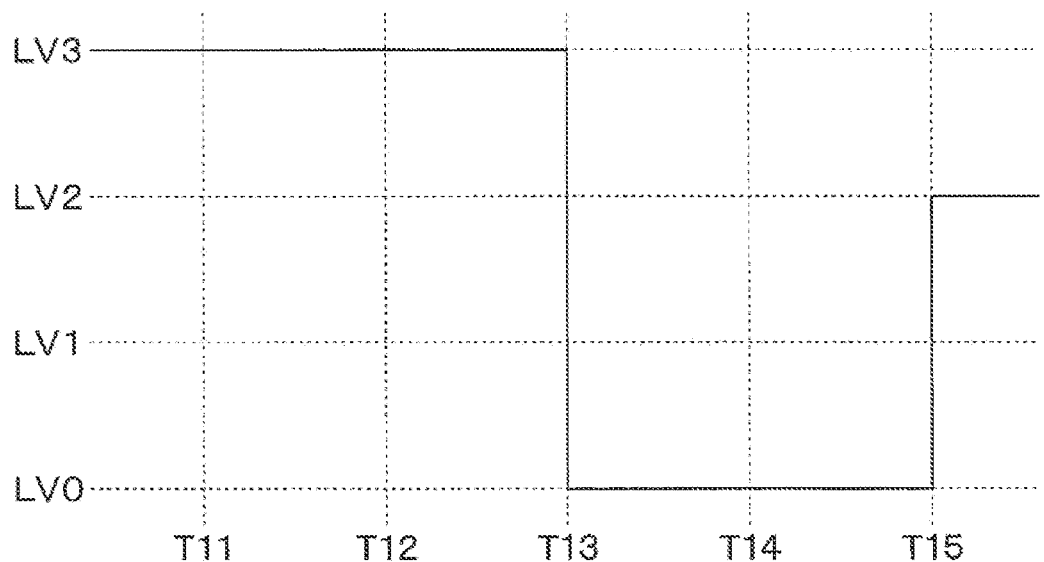
FIG. 4 is a time chart illustrating the transition of autonomous driving levels according to the first embodiment.

FIG. 4 illustrates a typical example of transitioning of the autonomous driving level from the automated driving to level 2, namely, hands-off operation at the end of an automated-driving road section. In the drawing, "LV" stands for "level." Each of T11 through T15 corresponds to the time and indicates the passage of time.

During the automated driving, as above, the driver is not obliged to monitor the surroundings, for example, and can freely perform the second task. Therefore, the driver's attention is highly likely to be distracted from driving during the automated driving.

During the hands-off operation, the driver is obliged to monitor the surroundings, for example. However, similar to the automated driving, the driver is not requested to perform the steering control operation and the acceleration/deceleration control operation. The driver's behavior regarding driving manipulation is similar between the automated driving and the hands-off operation. The driver may misunderstand the currently active autonomous driving level when the automated driving transitions to the hands-off operation, It may be possible to more reliably improve the driver's driving awareness in response to a decrease in the autonomous driving level by not only recognizing and understanding the provided information but also involving physical motions. When the automated driving terminates and then the operation transitions to the hands-off operation according to the present embodiment, the automation level determining portion 184 transitions to an autonomous driving level lower than the hands-off operation first, and then to the hands-off operation.

According to the typical example, as illustrated in FIG. 4, the automation level determining portion 184 transitions to level 0 first, namely, the manual operation, and then to the hands-off operation when the automated driving terminates and then transitions to the hands-off operation. The driver's driving awareness increases when the driver is forced to take the manual operation at the end of the automated driving. The manual operation transitions to the hands-off operation after the driver's driving awareness sufficiently increases. The driver can reliably recognize the active autonomous driving level. It is possible to force the driver to take an appropriate driving in preparation to the transition of the autonomous driving level.

By reference to FIGS. 4 through 7, the description below explains specific examples of operation control and display control in the typical example. At time T11, the in-vehicle system 10 issues a driving changeover request. Time T11 corresponds to a predetermined time earlier than the scheduled time at which the subject vehicle reaches the end point of an automated-driving road section. In response to the driving changeover request, the display command transmission portion 186 transmits display command information to the HMI control device 25. In this case, the display command information displays a visual line guidance display GA illustrated in FIG. 5 on the CID display 231 as a display device to display second task screens.

The visual line guidance display GA guides the driver's visual line from the second task screen to the front display device. The "front display device" is placed in front of the driver, namely, on the front toward which the subject vehicle travels from the viewpoint of the driver. According to the present embodiment, the front display device corresponds to the meter panel 21 and the HUD device 22. The front display device displays information or images in front of the driver, namely, on the front toward which the subject vehicle travels from the viewpoint of the driver.

Specifically, the HMI control device 25 displays the visual line guidance display GA of "→→→CAUTION AHEAD→→→" in the information display area DA1 which is placed above the screen area DA2 as a second task screen display area in the CID display 231. The visual line guidance display GA in the form of animation may further enhance the effect of visual line guidance. The animation display can move multiple symbols such as "→→→" more luminous than other symbols in the visual line guidance direction, namely, to the right toward the front display device. Another example can move the character string "CAUTION AHEAD" in the visual line guidance direction.

In response to the driving changeover request, the display command transmission portion 186 transmits the display command information to the HMI control device 25. In this case, the display command information allows the front display device to provide the transition-related display and action instruction displays illustrated in FIG. 5. Consequently, the meter panel 21 displays the transition-related display such as "AUTOMATED DRIVING WILL END 3 KM AHEAD" in the level information display area DB1 at the top of the meter display 212. The meter panel 21 also displays a first action instruction display GB1, a second action instruction display GB2, a third action instruction display GB3, and a fourth action instruction display GB4 in the driving information display area DB2 of the meter display 212. The first action instruction display GB1, the second action instruction display GB2, the third action instruction display GB3, and the fourth action instruction display GB4 instruct the driver to take predetermined driving attitudes.

Figure 5:
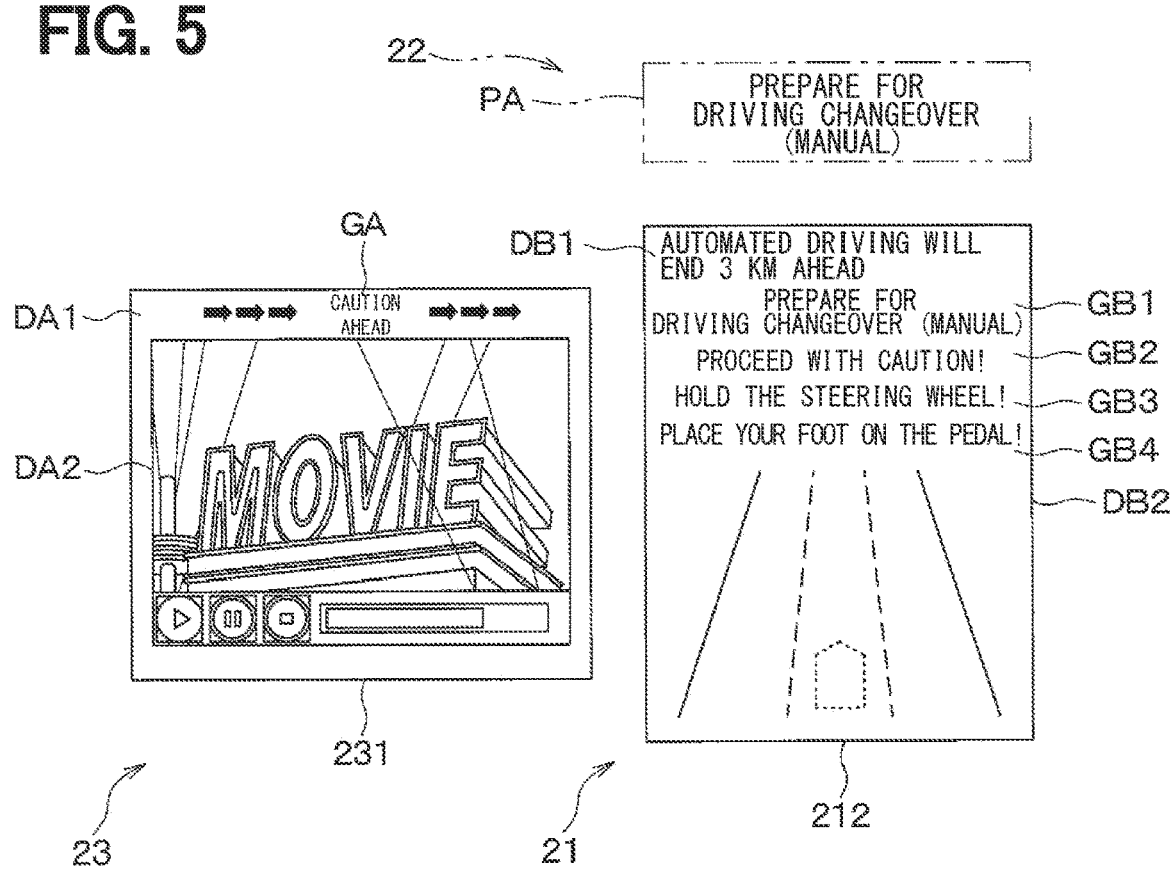
FIG. 5 is a schematic diagram illustrating a display on the HMI device according to the first embodiment.

According to the example in FIG. 5, the meter display 212 displays the first action instruction display GB1, "PREPARE FOR DRIVING CHANGEOVER (MANUAL)." The meter display 212 displays the second action instruction display GB2, "PROCEED WITH CAUTION!" The meter display 212 displays the third action instruction display GB3, "HOLD THE STEERING WHEEL!" The meter display 212 displays the fourth action instruction display GB4, "PLACE YOUR FOOT ON THE PEDAL!"

According to the example in FIG. 5, the first action instruction display GB1 of "PREPARE FOR DRIVING CHANGEOVER (MANUAL)" corresponds to the transition-related display. The first action instruction display GB1 also corresponds to a main action instruction display that instructs a main action. The "main action" is necessary for the transfer of control to the driver due to a decrease in the autonomous driving level and includes the adjustment of the driving posture. The second action instruction display GB2 of "PROCEED WITH CAUTION!" corresponds to a sub-action instruction display that instructs for a sub-action. The "sub-action" promotes or supplements the main action and includes the adjustment of the driving awareness. The second action instruction display GB2 also corresponds to the main action instruction display. The third action instruction display GB3 of "HOLD THE STEERING WHEEL!" corresponds to the main action instruction display. The fourth action instruction display GB4 of "PLACE YOUR FOOT ON THE PEDAL!" corresponds to the main action instruction display. In response to the driving changeover request, the display command transmission portion 186 transmits the display command information to the HMI control device 25. In this case, the display command information allows the HMI device 20 to provide the main action instruction display and the sub-action instruction display illustrated in FIG. 5.

The HUD device 22 displays the transition-related display of "PREPARE FOR DRIVING CHANGEOVER (MANUAL)." The display on the HUD device 22 provides a narrow visible range and becomes fully visible in accordance with a transition to the manual driving posture. The driver visually recognizes the visual line guidance display GA on the CID display 231. The driver's visual line is guided to the transition-related display on the HUD device 22. The driver's posture naturally transitions to the manual driving posture. The driver visually recognizes the main action instruction display and the sub-action instruction display. It is possible to effectively enhance the driver's awareness to take the manual driving posture. The driver's visual line is guided to the transition-related display on the HUD device 22 as the front display device. The driver can be effectively urged to fast take the manual driving posture.

Figure 6:
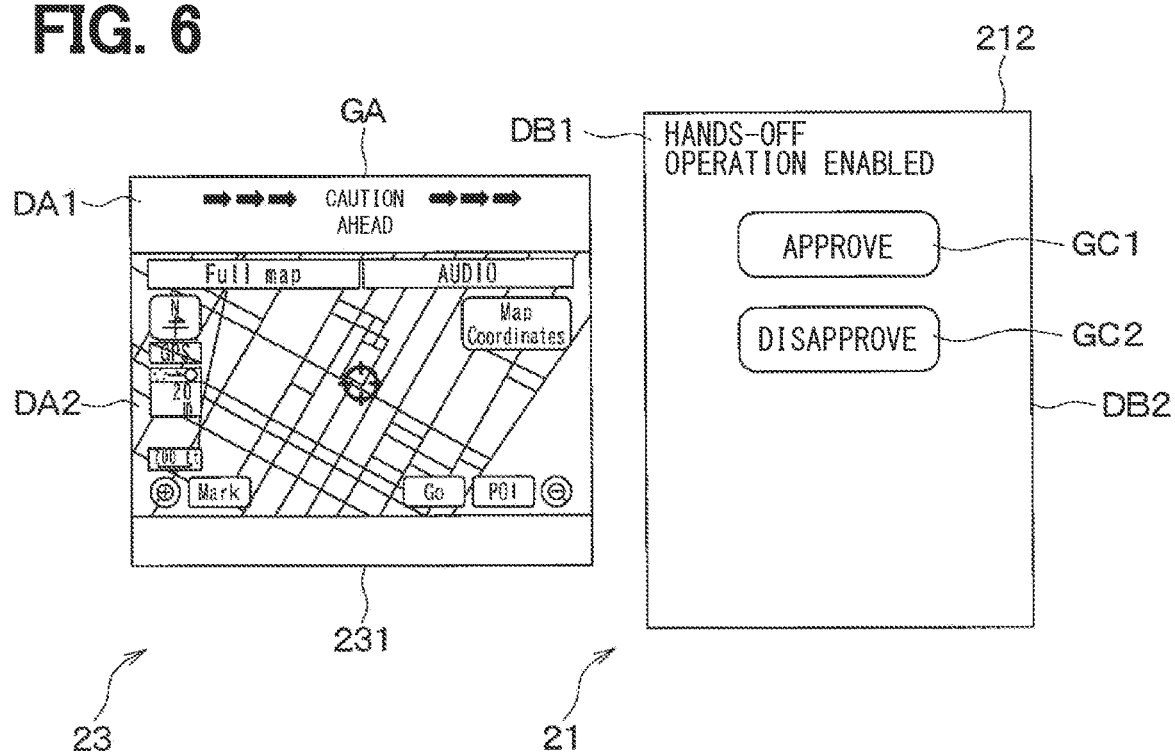
FIG. 6 is a schematic diagram illustrating a display on the HMI device according to the first embodiment.

At time T11, the HMI device 20 provides the display illustrated in FIG. 5. Then, at time T12, the driving changeover operation, namely, the main action and the sub-action, starts. The time lag from display start time T11 to driving changeover start time T12 corresponds to the reaction time of a standard driver. At display start time T11 and later, the automation level determining portion 184 monitors whether the driving changeover operation terminates, based on the resultant driver state acquired by the driver state acquisition portion 182 and the resultant driving manipulation state determined by the manipulation state determination portion 183. At time T13, the driving changeover operation terminates, enabling manual operation. The automation level determining portion 184 shifts the autonomous driving level from automated driving to manual operation at time T13 before time T14 at which the end of the automated-driving-capable section comes. During the manual operation, the screen area DA2 of the CID display 231 displays a navigation screen, as illustrated in FIG. 6. The information display area DA1 continues displaying the visual line guidance display GA to prevent the driver from gazing at the navigation screen for a long time.

After the manual operation starts at time T13, the stabilized driver's driving manipulation can smoothly shift the manual operation to the hands-off operation. Then, the manipulation state determination portion 183 determines the driver's driving manipulation state. The automation level determining portion 184 permits the hands-off operation when the manipulation state determination portion 183 determines that the driving manipulation state corresponding to the manual operation is stabilized (i.e., stably continues).

When the driving manipulation state corresponding to manual operation is stabilized, the display command transmission portion 186 transmits the display command information to the HMI control device 25. In this case, the display command information allows the HMI device 20 to provide the transition-related display and an approval request display. The approval request display prompts or requests the driver to perform an input operation to approve the hands-off operation.

As illustrated in FIG. 6, the meter display 212 provides the transition-related display of "HANDS-OFF OPERATION ENABLED" in the level information display area DB1. The meter display 212 provides a first input request display GC1 and a second input request display GC2 in the driving information display area DB2. The first input request display GC1 shows an approval button containing the character string "APPROVE." The second input request display GC2 shows a disapproval button containing the character string "DISAPPROVE."

At time T15, the driver performs the approval operation, allowing the automation level determining portion 184 to set the implementation of the hands-off operation. Then, the in-vehicle system 10 starts the hands-off operation.

Figure 7:
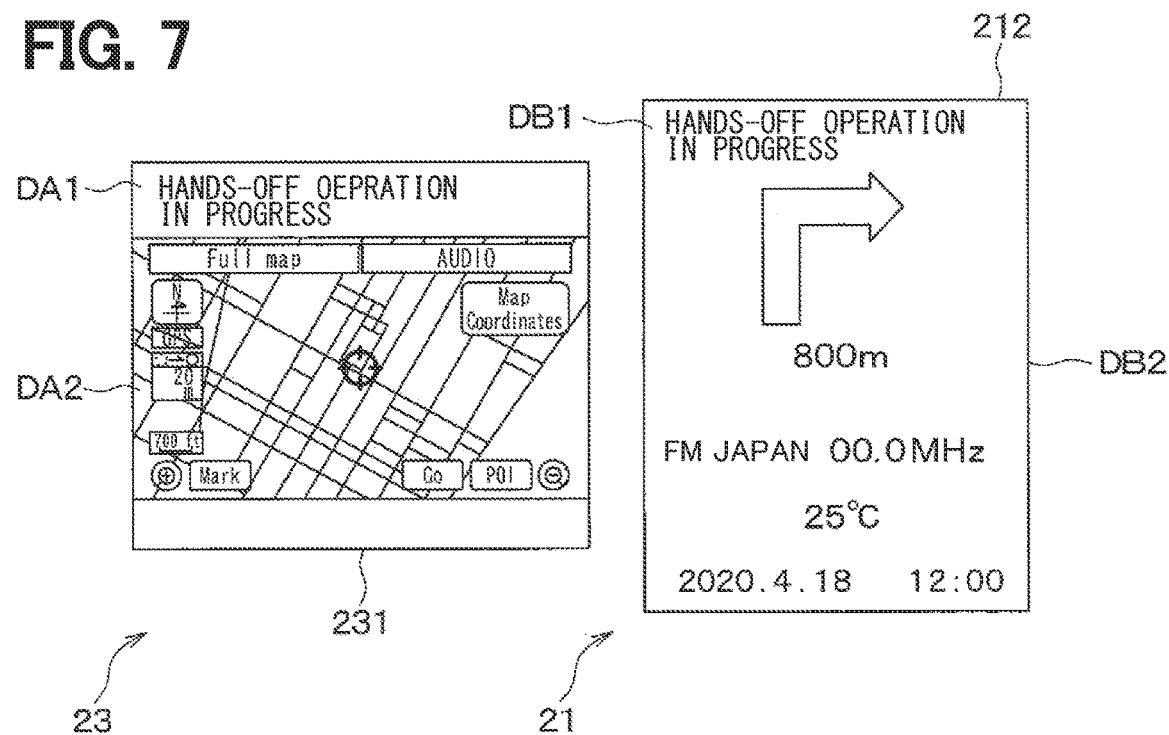
FIG. 7 is a schematic diagram illustrating a display on the HMI device according to the first embodiment.

During the hands-off operation, as illustrated in FIG. 7, the CID display 231 appears as follows. The information display area DA1 provides the implementation-related display of "HANDS-OFF OPERATION IN PROGRESS." The screen area DA2 displays the navigation screen. The meter display 212 appears as follows. The level information display area DB1 provides the implementation-related display of "HANDS-OFF OPERATION IN PROGRESS." The driving information display area DB2 displays various information such as route information. According to the example in FIG. 7, the driving information display area DB2 displays the route information to turn right at the intersection 800*m* ahead, the radio station, the outside temperature, and the current date and time.

Figure 8:
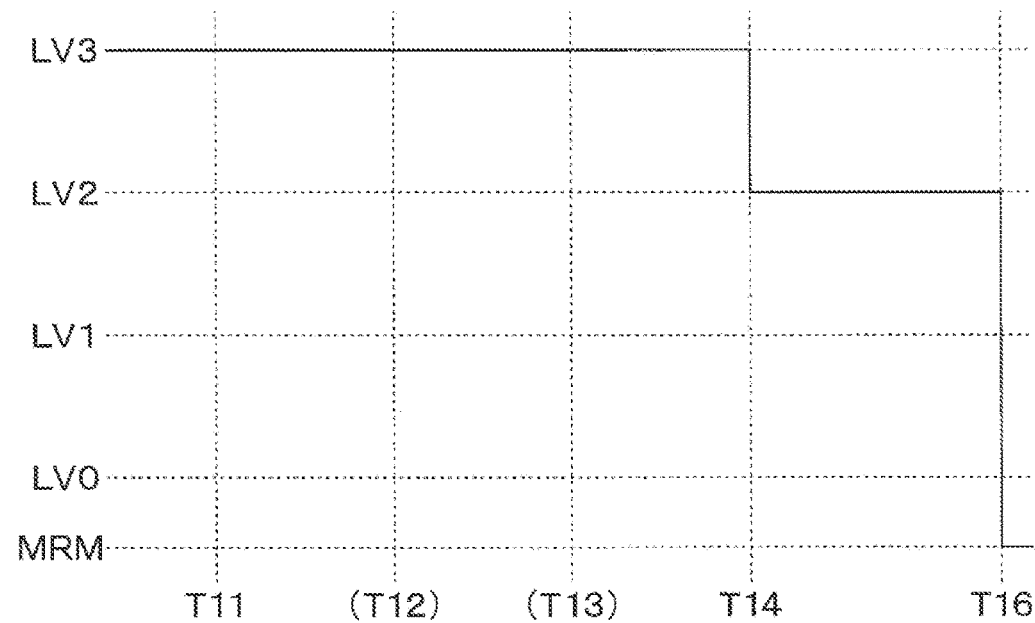
FIG. 8 is a time chart illustrating the transition of autonomous driving levels according to the first embodiment.

FIG. 4 illustrates the transition of the autonomous driving levels when the driver follows the driving changeover request. Contrastingly, FIG. 8 illustrates the transition of the autonomous driving levels when the driver does not follow the driving changeover request and does not take the main action.

Suppose the predetermined driving changeover operation is not performed between times T12 and T13. Then, the automation level determining portion 184 continues the automated driving until time T14 at which the automated-driving road section ends. Meanwhile, the automation level determining portion 184 waits for the driving changeover operation to occur. Suppose the driving changeover operation is performed by time T14. Then, the automation level determining portion 184 shifts the autonomous driving level from the automated driving to the manual operation. Suppose the driving changeover operation is not performed by time T14. Then, the automation level determining portion 184 shifts the autonomous driving level from the automated driving to the hands-off operation at time T14.

The display command transmission portion 186 continues transmitting display command information to the HMI control device 25 even if the predetermined driving changeover operation is not performed between times T12 and T13. The display command information allows the front display device to provide the action instruction display illustrated in FIG. 5. Thereby, the driving changeover request continues for a predetermined duration after time T14 to provide a driving attitude prepared enough to satisfactorily continue the hands-off operation. It may be impossible to provide a driving attitude prepared enough to satisfactorily continue the hands-off operation even after a predetermined duration elapsed from time T14. Then, the in-vehicle system 10 performs a predetermined emergency process at time T16. The emergency process is comparable to a break suggestion or MRM to safely stop the subject vehicle. MRM stands for Minimal Risk Maneuver.

First Embodiment: Overview

According to the present embodiment, the automation level determining portion 184 terminates a high autonomous driving level and transitions to a middle autonomous level by transitioning from the high autonomous driving level to a low autonomous driving level first and then to the middle autonomous level. The high autonomous driving level is comparable to an autonomous driving level included in the automated driving at levels 3 through 5. The middle autonomous level corresponds to an autonomous driving level lower than the high autonomous driving level. The low autonomous driving level corresponds to an autonomous driving level even lower than the middle autonomous level. It is possible to effectively enhance the driver's awareness regarding the transition of autonomous driving levels at the termination of the high autonomous driving level included in the automated driving at levels 3 through 5.

The "high autonomous driving level" can be level 4 or 5 when the in-vehicle system 10 is adaptable to level 4 and higher. In this case, the "low autonomous driving level" can be level 0 or 1.

According to the present embodiment, the automation level determining portion 184 allows the implementation of the middle autonomous level at least if the manipulation state determination portion 183 determines that the driving manipulation state for the low autonomous driving level is stabilized. When the driving manipulation state corresponding to the low autonomous driving level is stabilized, the display command transmission portion 186 transmits the display command information to the HMI control device 25. In this case, the display command information causes the HMI device 20 to display the approval request display. The approval request display prompts the driver for an input operation to approve the implementation of the middle autonomous level. Suppose a specified condition to perform the middle autonomous level is satisfied, the specified driving manipulation state stabilizes, and the driver grants the approval. Then, the automation level determining portion 184 executes the middle autonomous level. It is possible to allow the autonomous driving levels to transition even more stably.

Second Embodiment

The description below explains the second embodiment by reference to FIGS. 9 and 10. The description below covers mainly the differences between the second embodiment and the first embodiment. The first embodiment and the second embodiment use the same reference numerals for mutually equal or congruent parts. Unless there is a technical contradiction or additional explanation, the explanation in the first embodiment may be appropriately applied to the explanation of the second embodiment in terms of the components assigned with the same reference numerals as the first embodiment. The same applies to a third embodiment described later.

The in-vehicle system 10 according to the present embodiment is configured similarly to the first embodiment. The vehicle 1 and the in-vehicle system 10 according to the present embodiment are configured as illustrated in FIGS. 1 and 2. However, the present embodiment slightly differs from the first embodiment in operation modes and corresponding functional configurations.

According to the present embodiment, the automation level determining portion 184 sets the autonomous driving level at the low autonomous driving level depending on the causes (reasons) for terminating the high autonomous driving level. It is noted that the low autonomous driving level is implemented once before the high autonomous driving level transitions to the middle autonomous level. The autonomous driving level at the low autonomous driving level can vary with the causes of terminating the high autonomous driving level. The driver can take a more appropriate driving attitude corresponding to the cause of terminating the high autonomous driving level.

For example, suppose a first case where the autonomous driving level transitions from the automated driving to the hands-off operation at the end of the automated-driving road section. In the first case, the driver's driving awareness just needs to increase high enough to smoothly transition to the hands-off operation without the need to increase high enough to be able to fast respond to the manual operation.

Figure 9:
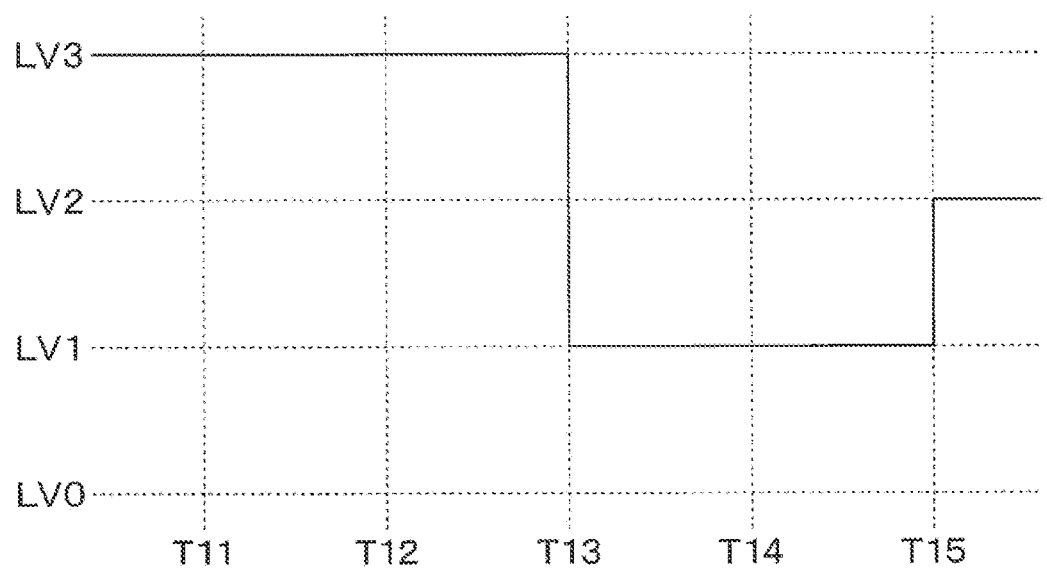
FIG. 9 is a time chart illustrating the transition of autonomous driving levels according to a second embodiment.

In this case, as illustrated in FIG. 9, the automation level determining portion 184 transitions from the automated driving to level 1 such as ACC, and then to the hands-off operation. Times T11 through T15 illustrated in FIG. 9 are equal to those in FIG. 4.

For example, suppose a second case of interrupting the automated driving due to an obstacle detected on the road while driving the automated-driving-capable section. In this case, the driver's driving awareness is preferably higher than in the first case. In the second case, as illustrated in FIG. 10, the automation level determining portion 184 once transitions from the automated driving to level 0, namely, the manual operation, and then to the hands-off operation.

Figure 10:
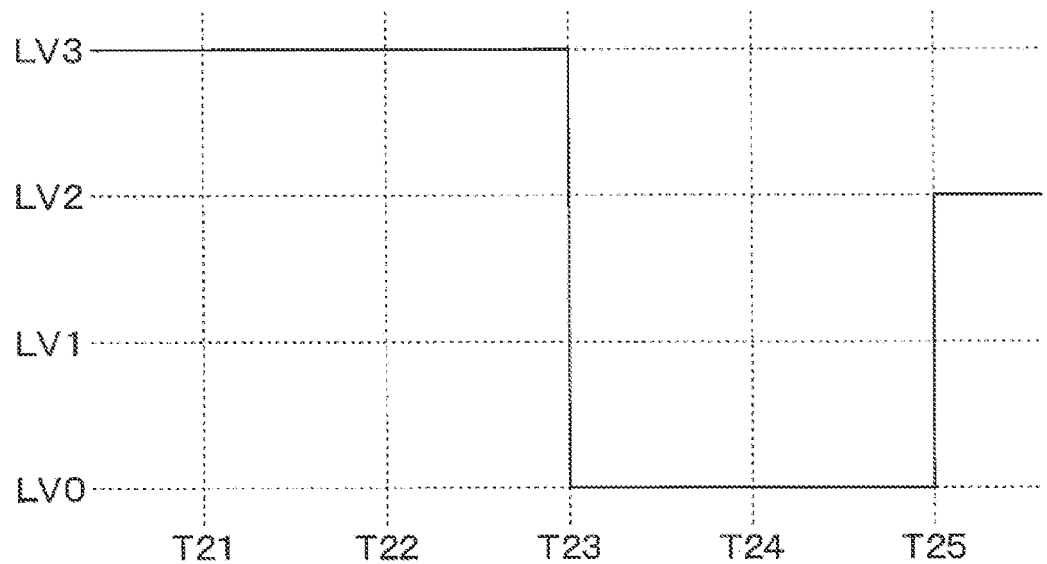
FIG. 10 is a time chart illustrating the transition of autonomous driving levels according to the second embodiment.

In FIG. 10, the in-vehicle system 10 issues a driving changeover request at time T21. Time T21 can be assumed to be almost equal to the time when the automation level determining portion 184 determines to interrupt the automated driving due to the detection of the obstacle on the road, for example.

The HMI device 20 issues the driving changeover request at time T21. Time T22 occurs after a predetermined time lag from the driving changeover request. At time T22, the driving changeover operation, namely, the main action and the sub-action, starts. At time T23, the driving changeover operation terminates. Then, the autonomous driving level shifts from the automated driving to the manual operation.

At time T24, the subject vehicle safely passes through the obstacle detected on the road, for example, to eliminate the condition to interrupt the automated driving. After time T24, the stabilized driver's driving manipulation state can smoothly shift the manual operation to the hands-off operation.

When the driving manipulation state corresponding to the manual operation is stabilized, the display command transmission portion 186 transmits the display command information to the HMI control device 25. In this case, the display command information causes the HMI device 20 to display the transition-related display and the approval request display related to the transition to the hands-off operation. At time T25, the driver's approval operation is accepted, and then the automation level determining portion 184 shifts the autonomous driving level from the manual operation to the hands-off operation.

Third Embodiment

The description below explains the third embodiment by reference to FIGS. 11 through 14. The in-vehicle system 10 according to the present embodiment is configured similarly to the first and second embodiments. However, the present embodiment slightly differs from the first and second embodiments in operation modes and corresponding functional configurations.

Figure 11:
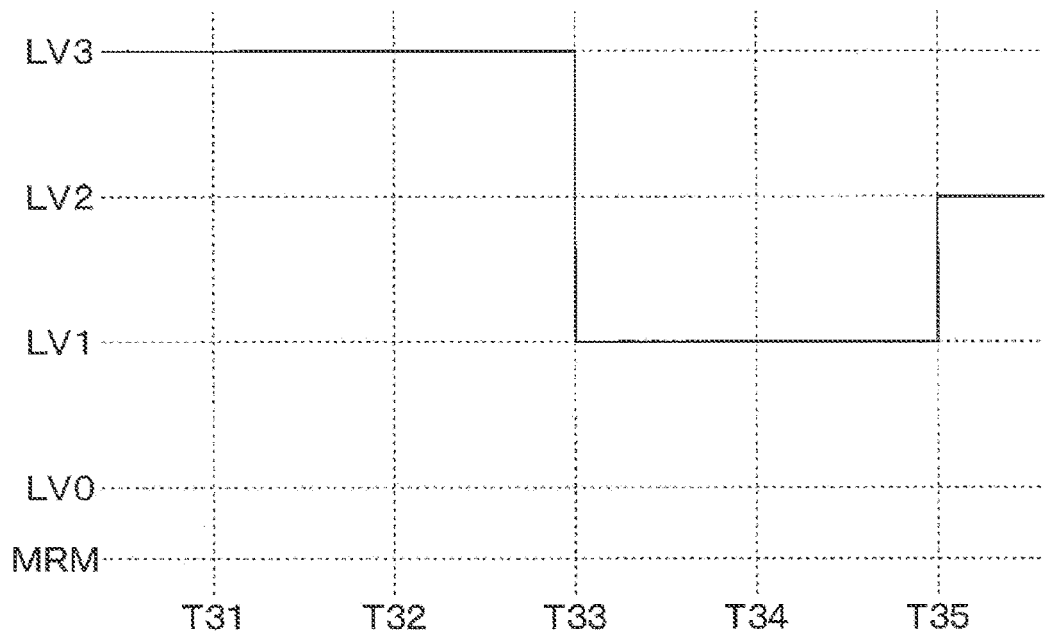
FIG. 11 is a time chart illustrating the transition of autonomous driving levels according to a third embodiment.

FIG. 11 illustrates an example of shifting the autonomous driving level from the automated driving to level 1 (ACC) and then to the hands-off operation at the end of the automated-driving-capable section. Times T31 through T35 in FIG. 11 are similar to times T11 through T15 in FIG. 4.

Figure 12:
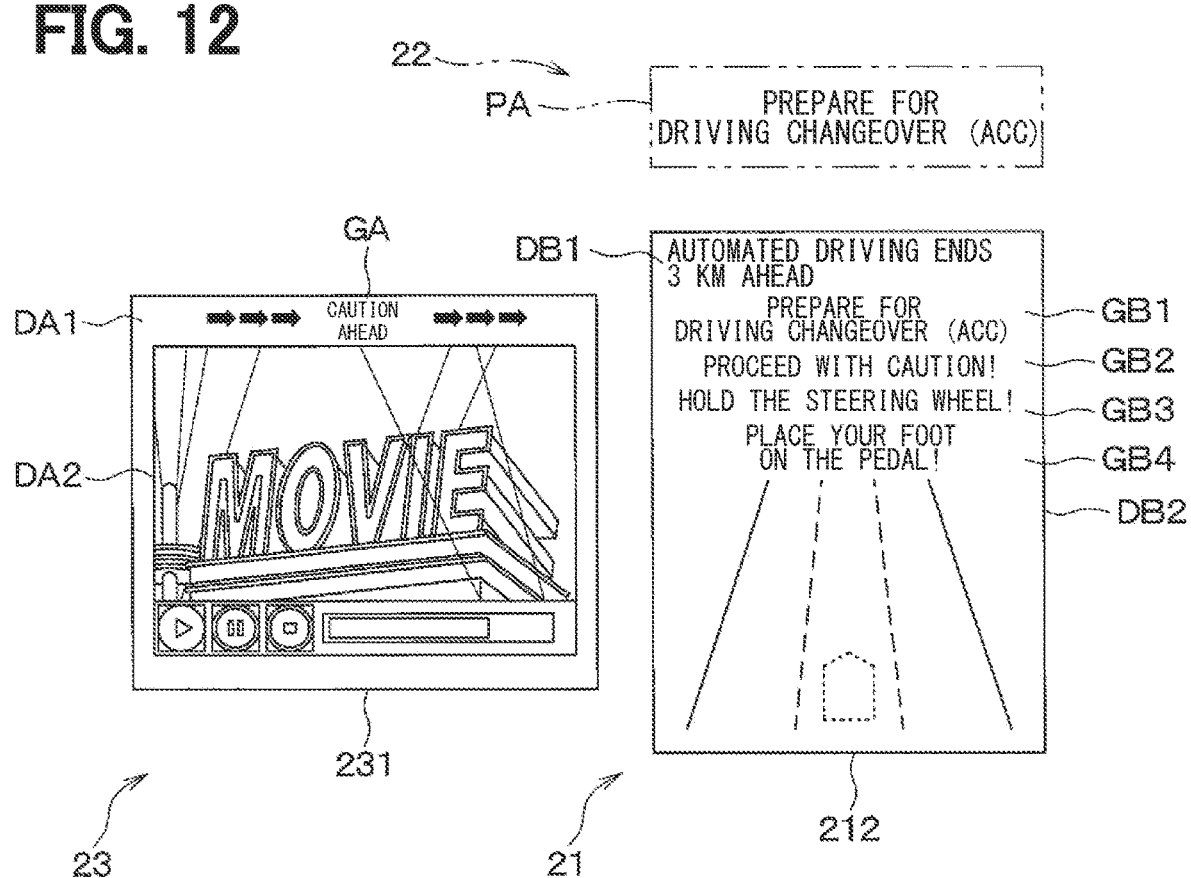
FIG. 12 is a schematic diagram illustrating a display on the HMI device according to the third embodiment.

This example assumes providing the first action instruction display GB1 through the fourth action instruction display GB4 illustrated in FIG. 12 in response to a driving changeover request at time T31.

In this case, the first action instruction display GB1 of "PREPARE FOR DRIVING CHANGEOVER (ACC)" corresponds to the main action instruction display that directs the main action required for driving changeover. The second action instruction display GB2 of "PROCEED WITH CAUTION!" corresponds to the main action instruction display and effectively functions as the sub-action instruction display that directs a sub-action to mainly increase the driving awareness.

ACC as level 1, the result of a transition from the automated driving, requires the driver to operate the steering wheel, but not the accelerator and the brake. The third action instruction display GB3 of "HOLD THE STEERING WHEEL!" corresponds to the main action instruction display that directs the main action. The fourth action instruction display GB4 of "PLACE YOUR FOOT ON THE PEDAL!" corresponds to the sub-action instruction display that directs the sub-action.

Ideally, both the main action and the sub-action should be performed properly from time T32, the beginning of the driving changeover operation, to time T34, the end of the automated-driving road section. However, the main action is required to continue the operation of the subject vehicle. The sub-action supplements an increase in driving awareness. When the main action is performed correctly, the transition of autonomous driving levels is permissible even if the sub-action is not performed or is performed somewhat unsatisfactorily. When the main action is performed correctly, the user of the subject vehicle may find it inconvenient to perform an emergency process such as MRM each time the sub-action is not performed or is performed unsatisfactorily.

Figure 13:
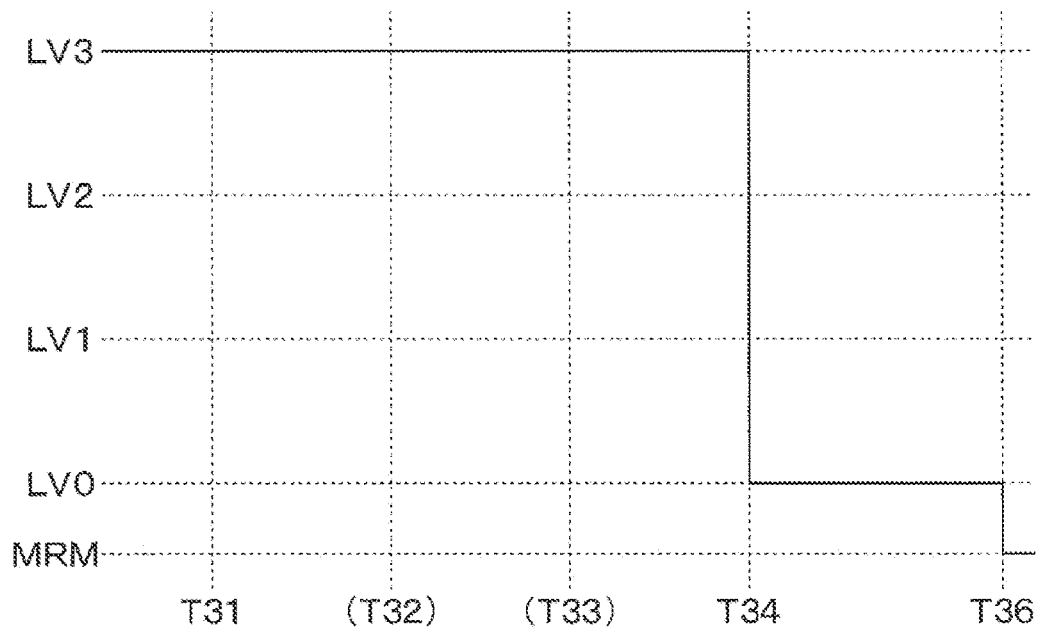
FIG. 13 is a time chart illustrating the transition of autonomous driving levels according to the third embodiment.

As a solution, the manipulation state detection portion 173 detects states or situations of the main action and the sub-action performed by the driver. If the main action is not performed, the vehicle control portion 185 performs a predetermined emergency process such as MRM. FIG. 13 illustrates the transition of the autonomous driving levels in this case.

Specifically, consider a case of not performing at least the main action out of the driving changeover operations that should have been performed at times T32 and T33. Then, the automation level determining portion 184 continues the automated driving until time T34 when the end of the automated-driving road section is reached. Meanwhile, the automation level determining portion 184 waits for the main action to be performed. Suppose the main action is performed by time T34. Then, the automation level determining portion 184 shifts the autonomous driving level from the automated driving to ACC. Suppose the main action is not performed by time T34. Then, at time T34, the automation level determining portion 184 shifts the autonomous driving level from the automated driving to the manual operation. Even after the transition to the manual operation, the vehicle control portion 185 can anytime activate the brake to avoid a collision or alleviate damages due to the collision, for example.

Consider a case of not performing a driving changeover operation that should have been performed at times T32 and T33. Even in such a case, the display command transmission portion 186 continues transmitting the display command information to the HMI control device 25. In this case, the display command information allows the front display device to provide the action instruction display illustrated in FIG. 12. The driving changeover request continues for a specified period even after time T34. Suppose the driving changeover does not occur even after a predetermined time elapsed from time T34. Then, at time T36, the in-vehicle system 10 performs a predetermined emergency process such as MRM.

No sub-action may be performed even though the main action has been performed. For example, the driver may hold the steering wheel 8 with the right hand while gazing forward in preparation for the transition to ACC and, at the same time, may sit in the driver's seat 2 with the legs crossed and the right shoulder lifted from the backrest. In such a case, the driver's driving posture is practically acceptable for ACC. However, it is favorable to correct the sitting posture to further increase driving awareness.

Figure 14:
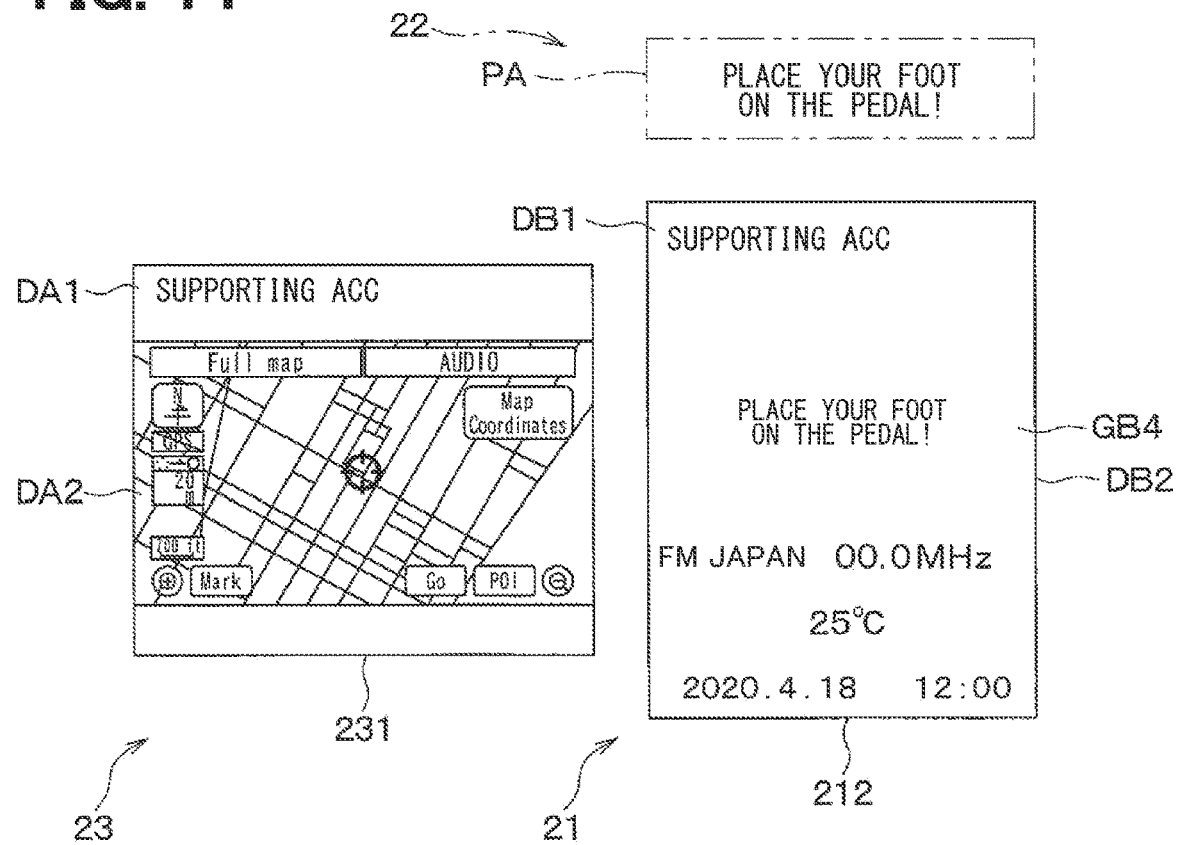
FIG. 14 is a schematic diagram illustrating a display on the HMI device according to the third embodiment.

In this case, the vehicle control portion 185 does not provide the safety stop control described above. As illustrated in FIG. 11, the automation level determining portion 184 shifts the autonomous driving level from the automated driving to level 1 (ACC) at time T33. As illustrated in FIG. 14, on the CID display 231, the information display area DA1 provides the implementation-related display of "SUPPORTING ACC." The screen area DA2 displays the navigation screen.

The display command transmission portion 186 transmits the display command information to the HMI control device 25. In this case, the display command information causes the HMI device 20 to provide a warning message. As illustrated in FIG. 14, the HUD device 22 displays the warning message "PLACE YOUR FOOT ON THE PEDAL." The meter display 212 continues displaying the fourth action instruction display GB4 corresponding to the warning message "PLACE YOUR FOOT ON THE PEDAL!"

Fourth Embodiment

The description below explains the fourth embodiment by reference to FIGS. 15 and 16. The in-vehicle system 10 according to the present embodiment is configured similarly to the above-described embodiments. The vehicle 1 and the in-vehicle system 10 according to the present embodiment are configured as illustrated in FIGS. 1 and 2. However, the present embodiment slightly differs from the above-described embodiments in operation modes and corresponding functional configurations.

The above-described embodiments adjust the mode of changing the autonomous driving levels to induce the driver's physical movement and effectively increase the driving awareness when the autonomous driving level decreases due to the end of the high autonomous driving level. However, a similar effect can be achieved by "superficially" shifting the autonomous driving levels based on the information provided by using the HMI device 20. There is no need to "actually" shift the autonomous driving levels to the low autonomous driving level through the use of the driving control device 18 according to the above-described embodiments.

Generally, the driving control device 18 settles and shifts the actual autonomous driving level during the transition of autonomous driving levels. In addition, the HMI device 20 provides various related information. Therefore, the driving control device 18 need not practically shift the actual autonomous driving levels if the information presentation using the HMI device 20 can induce the driver's physical movement to increase the driving awareness. According to the present embodiment, the information presentation such as displays on the HMI device 20 "virtually" implements the transition of autonomous driving levels according to the first embodiment.

According to the present embodiment, when the high autonomous driving level terminates, the display control portion 255 controls the HMI device 20 to provide the action instruction display that causes the driver to take a low-level associated state. The low-level associated state is a driver state capable of handling the low autonomous driving level. According to the present embodiment, the low autonomous driving level corresponds to an autonomous driving level at which the in-vehicle system 10 including the driving control device 18 does not provide at least the lateral motion control based on steering or the longitudinal motion control based on acceleration/deceleration. In other words, the low-level associated state signifies a driver state or driving attitude comparable to autonomous driving level 0 or 1.

Figure 15:
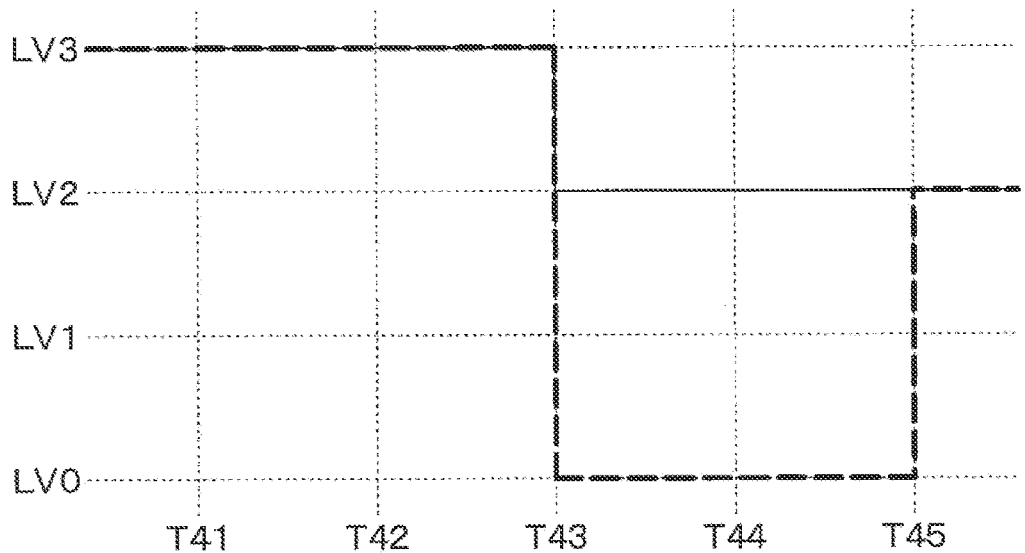
FIG. 15 is a time chart illustrating the transition of autonomous driving levels according to a fourth embodiment.
Figure 16:
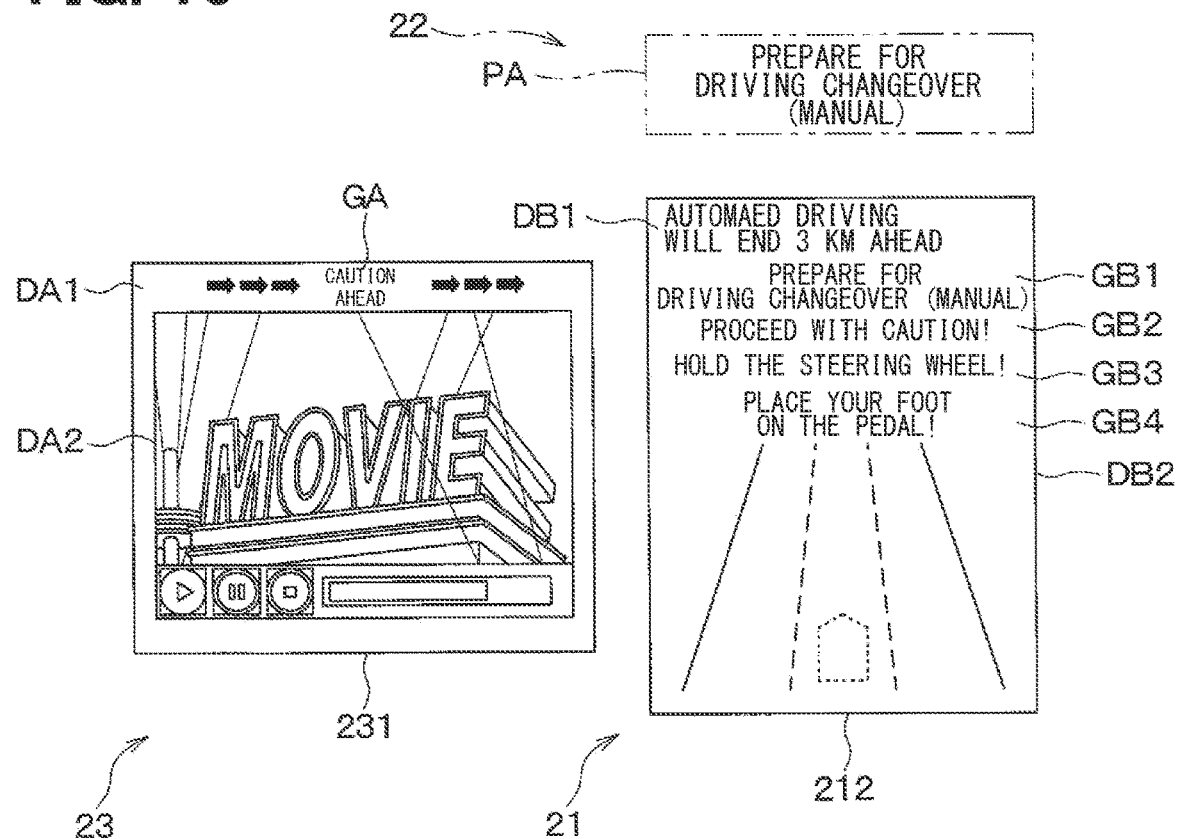
FIG. 16 is a schematic diagram illustrating a display on the HMI device according to the fourth embodiment.

Similar to the first embodiment, FIG. 15 illustrates a typical example where the autonomous driving level transitions from the automated driving to the hands-off operation at the end of the automated-driving road section. Times T41 through T45 in FIG. 15 are similar to times T11 through T15 in FIG. 4. In FIG. 15, the thin solid line represents the transition of the actual autonomous driving level. The thick dashed line represents the transition of the autonomous driving level corresponding to the implementation-related display in the HMI device 20.

According to the example in FIG. 15, at the end of the automated-driving road section, the driving control device 18 terminates the automated driving and transitions to the hands-off operation at level 2 without transitioning to level 1 or lower. The display control portion 255 causes the HMI device 20 to provide the action instruction display that allows the driver to once take the low-level associated state capable of handling manual operation.

The autonomous driving level based on the system is actually implemented by the driving control device 18 and transitions from the automated driving to the hands-off operation at level 2 without transitioning to level 1 or lower. Contrastingly, the autonomous driving level based on the driver's awareness is caused by the recognition of the displayed content on the HMI device 20 and the accompanying physical movement. In this case, the autonomous driving level transitions from the automated driving to an autonomous driving level lower than the hands-off operation first, and then transitions to the hands-off operation.

When the system-based autonomous driving level transitions from the automated driving to the hands-off operation, the driver is forced to take the manual driving posture, effectively increasing the driver's driving awareness. The driver can be forced to take a driving attitude appropriate to the transition of the autonomous driving levels. It is possible to effectively enhance the driver's awareness regarding the transition of autonomous driving levels at the termination of the automated driving.

Specifically, the in-vehicle system 10 issues a driving changeover request at time T41. In response to the driving changeover request, the display command transmission portion 186 transmits the display command information to the HMI control device 25. In this case, the display command information causes the CID display 231, a display device to display the second task screen, to provide the visual line guidance display GA illustrated in FIG. 16. The visual line guidance display GA illustrated in FIG. 16 is similar to the first embodiment illustrated in FIG. 5. The display command transmission portion 186 transmits the display command information to the HMI control device 25. In this case, the display command information causes the front display device to provide the transition-related display and the action instruction display illustrated in FIG. 16.

Then, the meter panel 21 displays the transition-related display of "AUTOMATED DRIVING WILL END 3 KM AHEAD" in the level information display area DB1 of the meter display 212. The meter panel 21 displays the first action instruction display GB1 through the fourth action instruction display GB4 similar to the first embodiment in the driving information display area DB2 of the meter display 212. The HUD device 22 displays the transition-related display of "PREPARE FOR DRIVING CHANGEOVER (MANUAL)." The CID device 23 provides the visual line guidance display GA in the information display area DA1 of the CID display 231.

At time T41, a driving changeover request is issued. Then, at time T42, the driving changeover operation starts. At this time, the first action instruction display GB1 of "PREPARE FOR DRIVING CHANGEOVER (MANUAL)" corresponds to the transition-related display. The first action instruction display GB1 remains displaying the necessity of transferring control from the system to the driver despite the fact that the transition destination displays the manual operation corresponding to the autonomous driving level lower than that of the obviously expected hands-off operation. The first action instruction display GB1 also corresponds to the main action instruction display for directing the main action required to transfer control to the driver due to a decrease in the autonomous driving level.

The second action instruction display GB2 of "PROCEED WITH CAUTION!" corresponds to the main action instruction display and effectively functions as a sub-action instruction display to direct the sub-action including the driving awareness adjustment. As above, the system shifts the autonomous driving level from the automated driving to the hands-off operation. During the hands-off operation, the driver is not requested to perform the steering control operation and the acceleration/deceleration control operation. The third action instruction display GB3 of "HOLD THE STEERING WHEEL!" corresponding to the manual operation is not required for the transition from the automated driving to the hands-off operation but concerns operations to improve the driving awareness. The third action instruction display GB3 corresponds to the sub-action instruction display. Similarly, the fourth action instruction display GB4 of "PLACE YOUR FOOT ON THE PEDAL!" also corresponds to the sub-action instruction display. The display control portion 255 causes the HMI device 20 to provide the main action instruction display and the sub-action instruction display as action instruction displays. In this case, the main action instruction display directs the main action including the driving posture adjustment. The sub-action instruction display directs the sub-action including the driving awareness adjustment.

At time T43, the driving changeover operation terminates and the driver takes a driving attitude capable of performing manual operation. The automation level determining portion 184 shifts the system-based autonomous driving level from the automated driving to level 2 [G mode]. The display control portion 255 shifts the display-based autonomous driving level from the automated driving to the manual operation. The system is assumed to implement the driving assist comparable to level 2 according to "SAE J3016" in progress from time T43 to time T45 when the hands-off operation actually starts despite the fact that the manual operation is superficially or visually in progress.

After the driving changeover operation terminates at time T43, a stabilized driver's driving manipulation state can enable a smooth transition to the hands-off operation. Then, the manipulation state determination portion 183 determines the driver's driving manipulation state. The automation level determining portion 184 permits the hands-off operation when the manipulation state determination portion 183 determines that the driving manipulation state corresponding to the manual operation stabilizes.

Specifically, suppose the driver state acquired by the driver state acquisition portion 254 stabilizes in the low-level associated state. Then, the display control portion 255 causes the HMI device 20 to provide an approval request display prompting an input operation to approve the implementation of the middle autonomous level. The approval request display is similar to that illustrated in FIG. 6. When the driver performs the approval operation at time T45, the automation level determining portion 184 determines implementation of the hands-off operation. Then, the in-vehicle system 10 starts the hands-off operation. At time T45 and later, the system-based autonomous driving level and the display-based autonomous driving level match each other, and both enter the hands-off operation. Sufficiently increased driver's driving awareness can ensure a much safer transition from the automated driving to the hands-off operation.

To terminate the high autonomous driving level according to the present embodiment, the display control portion 255 causes the HMI device 20 to provide an action instruction display that allows the driver to take a low-level associated state, as the driver state, capable of handling the low autonomous driving level. Specifically, suppose the high autonomous driving level terminates to transition to the middle autonomous level as an autonomous driving level between the high autonomous driving level and the low autonomous driving level. Then, the display control portion 255 controls the HMI device 20 to provide the action instruction display that instructs the driver to take the low-level associated state. The low autonomous driving level corresponding to the action instruction display is a superficial autonomous driving level different from the autonomous driving level that is actually implemented by the driving control device 18 between the end of the high autonomous driving level and the beginning of the middle autonomous level. It is possible to satisfactorily make the driver aware of the transition of the autonomous driving level at the end of the automated driving.

According to the present embodiment, the display control portion 255 provides the visual line guidance display GA on the CID display 231 which displays the second task screen. The visual line guidance display GA guides the driver's visual line from the second task screen to the HUD device 22 as the front display device. The driver's visual line is guided to the HUD device 22 as the front display device, making it possible to satisfactorily motivate the driver to quickly take a predetermined driving posture.

Fifth Embodiment

The description below explains the fourth embodiment by reference to FIGS. 17 through 19. The in-vehicle system 10 according to the present embodiment is configured similarly to the fourth embodiment. However, the present embodiment slightly differs from the fourth embodiment in operation modes and corresponding functional configurations. The present embodiment is a partial modification of the fourth embodiment.

The fourth embodiment changes the actual mode of transition among the autonomous driving levels in the first embodiment to a virtual or superficial version. Similarly, the present embodiment changes the actual mode of transition among the autonomous driving levels in the second embodiment to a virtual or superficial version.

According to the present embodiment, the display control portion 255 sets the autonomous driving level as the low autonomous driving level depending on the reasons for terminating the high autonomous driving level. The high autonomous driving level terminates and then superficially transitions to the low autonomous driving level. The autonomous driving level as the low autonomous driving level varies with the cause of terminating the high autonomous driving level. The driver can take a more appropriate driving attitude corresponding to the cause of terminating the high autonomous driving level.

Figure 17:
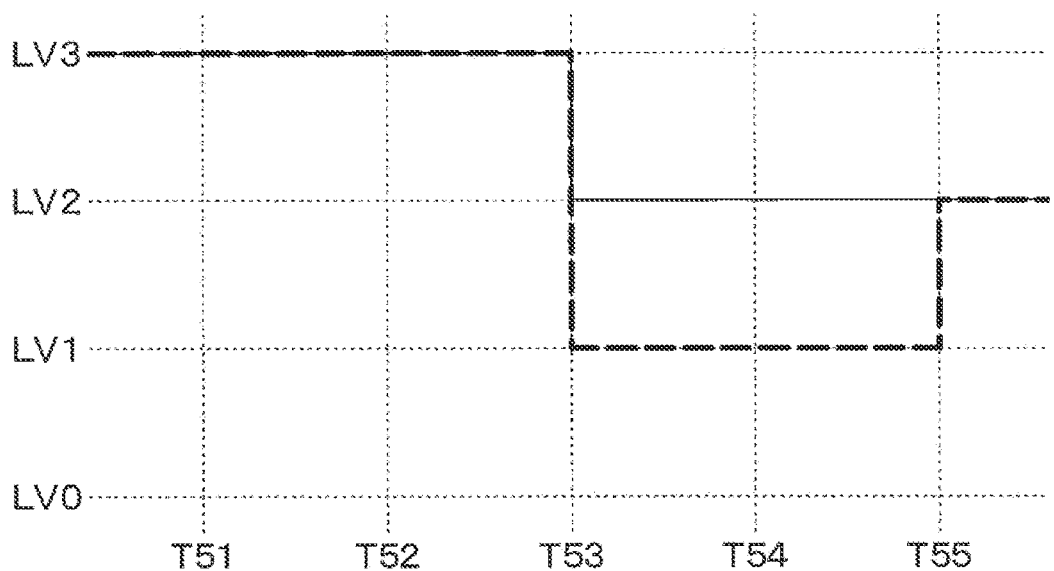
FIG. 17 is a time chart illustrating the transition of autonomous driving levels according to a fifth embodiment.

Similar to FIG. 9, FIG. 17 illustrates the transition of the autonomous driving level from the automated driving to the hands-off operation at the end of the automated-driving road section. Times T51 through T55 in FIG. 17 are similar to times T11 through T15 in FIGS. 4 and 9. In FIG. 17 and later, the thin solid line represents the transition of the actual autonomous driving level. The thick dashed line represents the transition of the autonomous driving level corresponding to the implementation-related display in the HMI device 20.

According to the example illustrated in FIG. 17, the system-based autonomous driving level transitions from the automated driving to level 2 [G mode] at time T53. At time T55, the driving manipulation state stabilizes to accept the driver's approval operation, and the system-based autonomous driving level transitions from level 2 [G mode] to the hands-off operation.

The driver's driving awareness just needs to increase high enough to smoothly transition to the hands-off operation without the need to increase high enough to be able to fast respond to the manual operation. The display-based autonomous driving level temporarily transitions from the automated driving to level 1 at time T53, and transitions from level 1 to the hands-off operation at time T55. The display mode corresponding to the driving changeover request at time T51 is similar to FIG. 12.

Figure 18:
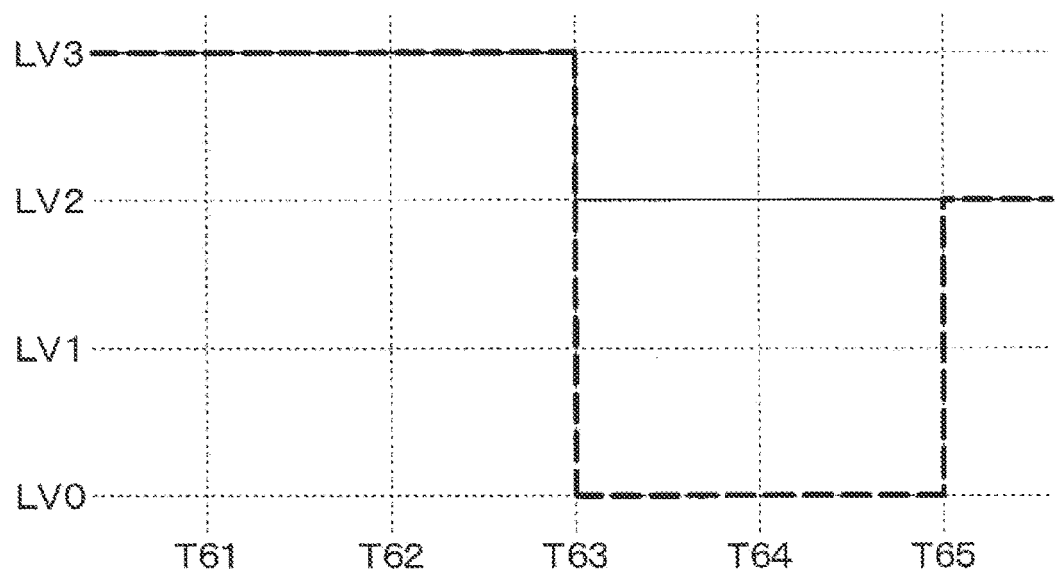
FIG. 18 is a time chart illustrating the transition of autonomous driving levels according to the fifth embodiment.

Similar to FIG. 10, FIG. 18 illustrates a case of interrupting the automated driving due to an obstacle detected on the road during the travel in the automated-driving road section. Times T61 through T65 in FIG. 18 are similar to times T21 through T25 in FIG. 10.

Even when the automated driving is interrupted due to obstacle detected on the road, it is favorable to maintain the system-based autonomous driving level after the interruption as high as possible. In this example, the system-based autonomous driving level transitions from the automated driving to level 2 [G mode] at time T63 when the driving changeover operation is completed. At time T65, the driving manipulation state stabilizes to accept the driver's approval operation, and the system-based autonomous driving level transitions from level 2 [G mode] to the hands-off operation.

In this example, however, the driver's driving awareness is preferably higher than in the example corresponding to the end of the automated-driving road section illustrated in FIG. 17. Therefore, the display-based autonomous driving level temporarily transitions from the automated driving to the manual operation at time T63, and transitions from the manual operation to the hands-off operation at time T65. The display mode for the driving changeover request at time T61 corresponds to the transition from the automated driving to the manual operation similar to FIG. 16.

Figure 19:
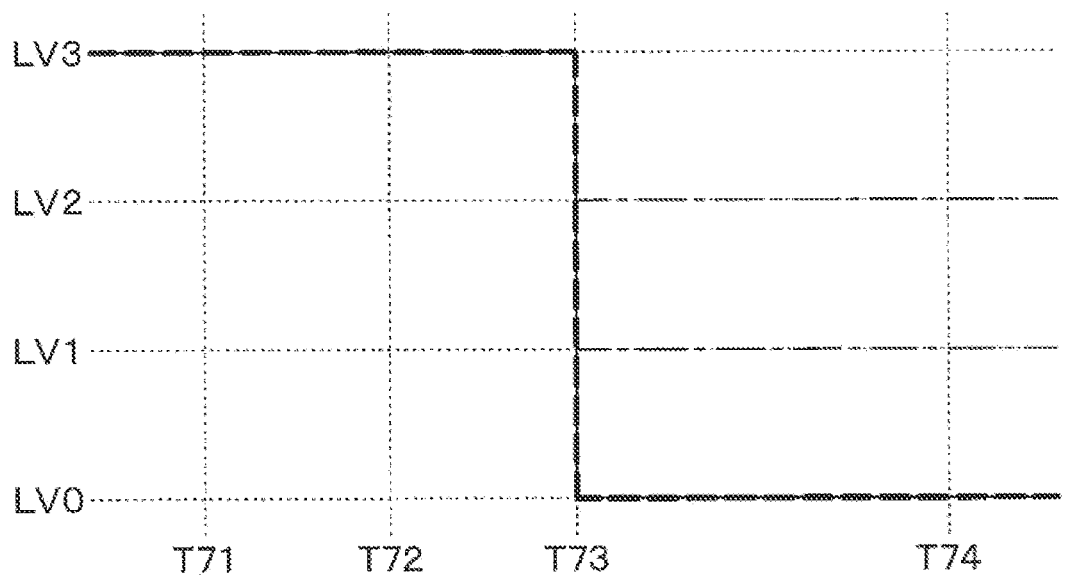
FIG. 19 is a time chart illustrating the transition of autonomous driving levels according to the fifth embodiment.

FIG. 19 illustrates a case of terminating the automated driving due to an occurrence of some abnormality in the in-vehicle system 10. Also in this example, the driver's driving awareness is preferably higher than in the example corresponding to the end of the automated-driving road section illustrated in FIG. 17. Therefore, the display control portion 255 shifts the display-based operation automation level from the automated driving to the manual operation.

It is favorable to maintain the system-based autonomous driving level or the driving assist level after the interrupt as high as possible. Therefore, the automation level determining portion 184 lowers the system-based autonomous driving level from the automated driving to a predetermined level. The predetermined level corresponds to the highest level feasible at that time.

Specifically, the driving control device 18 determines that the automated driving cannot continue due to the abnormality, and then issues a driving changeover request to transition to the manual operation at time T71. The display command transmission portion 186 transmits display command information to the HMI control device 25 so that the HMI device 20 provides a display for the driving changeover request.

At time T71, the HMI device 20 issues the driving changeover request. At time T72, the driving changeover operation starts. At time T73, the driving changeover operation terminates. Then, the display-based autonomous driving level transitions from the automated driving to the manual operation. While the automated driving terminates, the system-based autonomous driving level transitions to the highest level feasible at that time. Even if the system-based autonomous driving level only enables the manual operation, the driver can appropriately take over driving by shifting the display-based autonomous driving level from the automated driving to the manual operation, In this example, the operations automation system suffers from an abnormality that disables the automated driving from continuing. There occurs no request for the approval operation to shift the autonomous driving level to a higher level even at T74 or later when the driver's manual driving manipulation stabilizes. However, as above, the system is allowed to perform as much driving assist operation as possible despite the superficial manual operation in progress.

The process according to the cases of FIGS. 8 and 13 may be similarly applied to a case where the driving changeover operation is not performed in the examples illustrated in FIG. 17 through FIG. 19. It may be favorable to perform a predetermined emergency process such as MRM after a predetermined wait time. Alternatively, the emergency process may not be performed even if the driving changeover operation is not performed under the condition that it is possible to perform the minimal safety control operation such as a brake to avoid a collision or alleviate damages due to the collision, for example.

Sixth Embodiment

The description below explains the sixth embodiment by reference to FIGS. 20 and 21. The in-vehicle system 10 according to the present embodiment is configured similarly to the fourth and fifth embodiments. However, the present embodiment slightly differs from the fourth and fifth embodiments in operation modes and corresponding functional configurations. The present embodiment is a partial modification of the fourth and fifth embodiments.

This example proposes a transition to level 1 (ACC) through the use of the HMI device 20 to enhance the driving awareness although it is possible to transition to the hands-off operation at the end of the automated-driving road section. FIG. 20 illustrates the case of performing an approval operation for the proposal of transition to ACC. FIG. 21 illustrates the case of not performing the approval operation.

Figure 20:
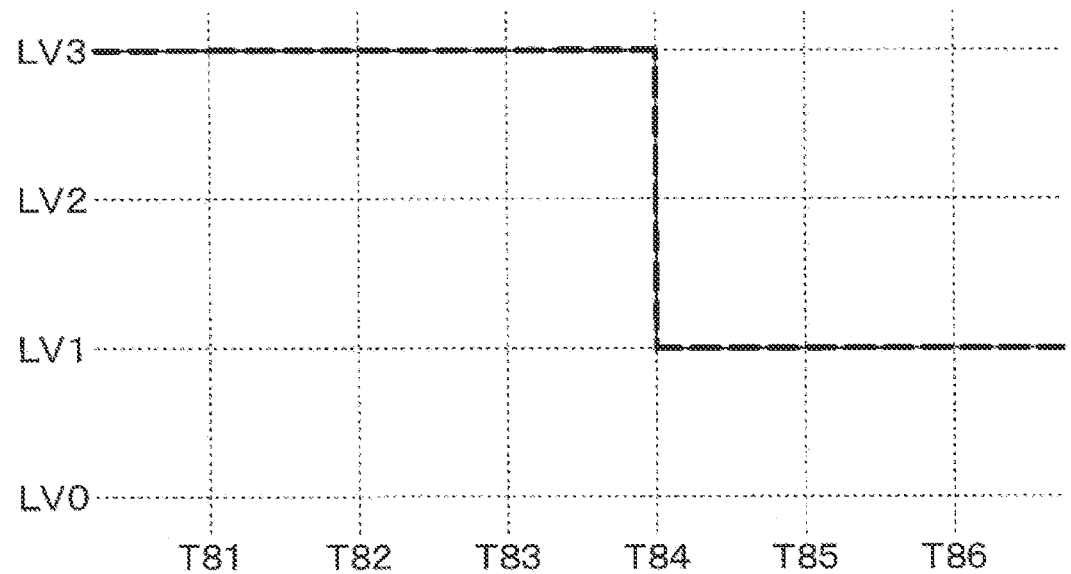
FIG. 20 is a time chart illustrating the transition of autonomous driving levels according to a sixth embodiment.

According to the example in FIG. 20, the termination of the automated driving is caused by the end of the automated-driving road section and a transition to ACC based on the approved ACC. According to the example in FIG. 21, the termination of the automated driving is caused by the end of the automated-driving road section and a transition to the hands-off operation based on the disapproved ACC. Due to the different causes of the termination, FIG. 20 differs from FIG. 21 in the modes of transition from the automated driving to the system-based autonomous driving level and the display-based autonomous driving level.

See the example in FIG. 20. At time T81, the in-vehicle system 10 issues a driving changeover request similar to time T41 in FIG. 15 or time T51 in FIG. 17. At time T82, the in-vehicle system 10 proposes the transition to ACC. At time T83, the driver performs an approval operation on the proposal for the transition to ACC and starts the driving changeover operation to take a driving attitude appropriate for the ACC.

In this example, the driver is clearly aware of the transition from the automated driving to ACC. When the driving changeover operation terminates at time T84 before time T85, the in-vehicle system 10 shifts both the system-based autonomous driving level and the display-based autonomous driving level from the automated driving to ACC at level 1. Time T85 corresponds to the time when the automated-driving road section ends. At time T86, the driver's driving manipulation state stabilizes, and the transition proposal can be performed as appropriate when a condition to shift the autonomous driving level to a higher level such as level 2 [G mode] is satisfied.

Figure 21:
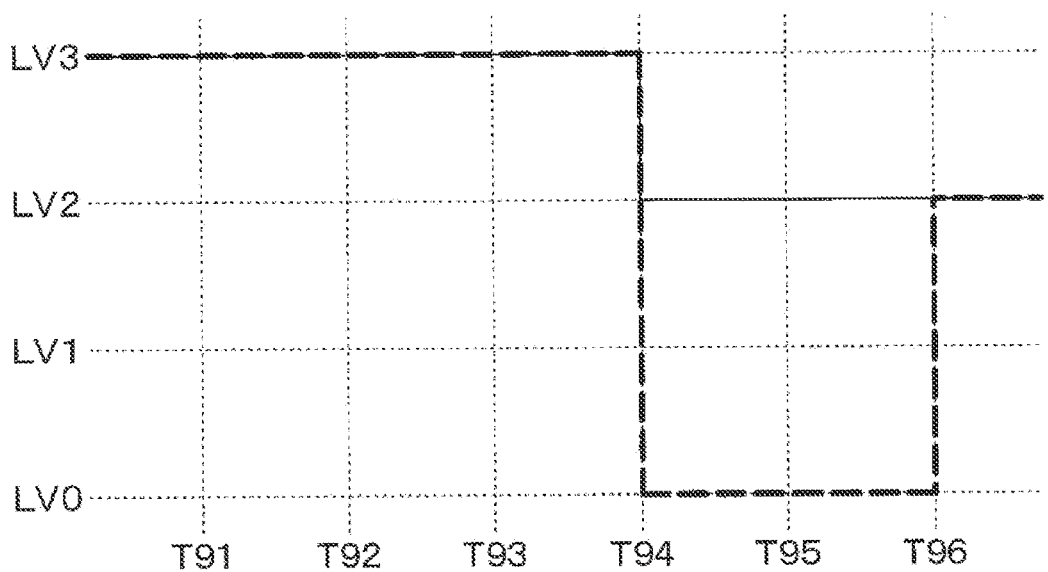
FIG. 21 is a time chart illustrating the transition of autonomous driving levels according to the sixth embodiment.

See the example in FIG. 21. At time T91, the in-vehicle system 10 issues a driving changeover request similar to the example illustrated in FIG. 20. At time T92, the in-vehicle system 10 proposes the transition to ACC. Times T91 and T92 are similar to times T81 and T82 illustrated in FIG. 20.

In this example, the driver does not perform the approval operation on the proposal for the transition to ACC by time T93. The driver may not be clearly aware of transitioning from the automated driving to a specified autonomous driving level. At time T93, the in-vehicle system 10 issues a driving changeover request for the manual operation, similar to time T41 in FIG. 15.

At time T94 before time T95, the driving changeover operation to the manual operation terminates. Then, the automation level determining portion 184 shifts the system-based autonomous driving level from the automated driving to level 2 [G mode]. At time T95, the end of the automated-driving road section is reached. Meanwhile, the display control portion 255 shifts the display-based autonomous driving level from the automated driving to the manual operation. The system is assumed to implement the driving assist comparable to level 2 according to "SAE J3016" in progress at time T94 and later despite the fact that the manual operation is superficially or visually in progress.

A subsequently stabilized driver's driving manipulation state can enable a smooth transition to the hands-off operation. When the driver's driving manipulation state stabilizes, the proposal for a transition to the hands-off operation is performed. When the approval operation for the transition proposal is performed at time T96, the in-vehicle system 10 shifts both the system-based autonomous driving level and the display-based autonomous driving level to the hands-off operation.

Seventh Embodiment

The description below explains the seventh embodiment by reference to FIGS. 22 through 24. The in-vehicle system 10 according to the present embodiment is configured similarly to the first embodiment, for example. However, the present embodiment slightly differs from the first embodiment, for example, in operation modes and corresponding functional configurations.

Figure 22:
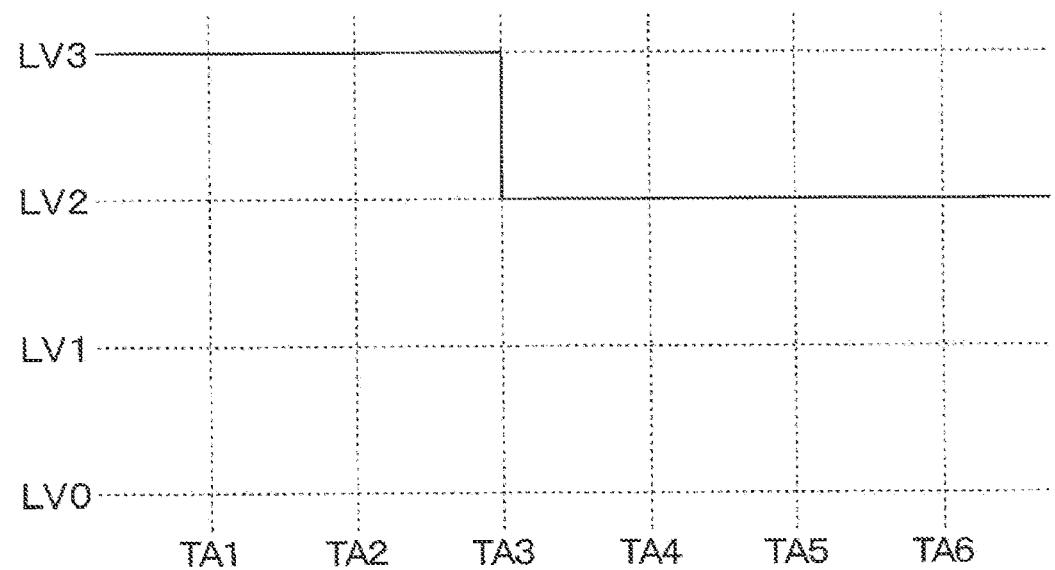
FIG. 22 is a time chart illustrating the transition of autonomous driving levels according to a seventh embodiment.
Figure 23:
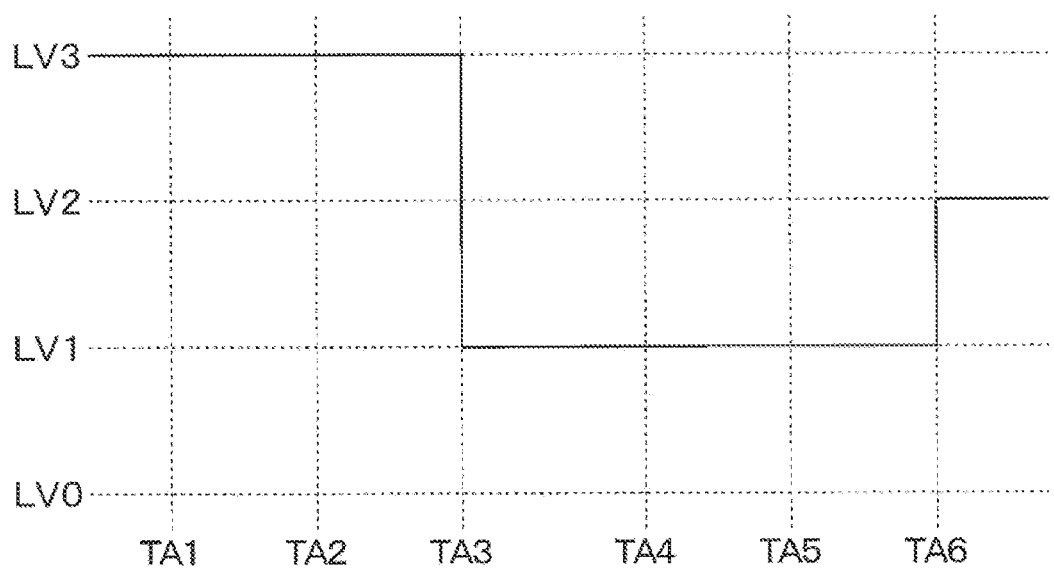
FIG. 23 is a time chart illustrating the transition of autonomous driving levels according to the seventh embodiment.
Figure 24:
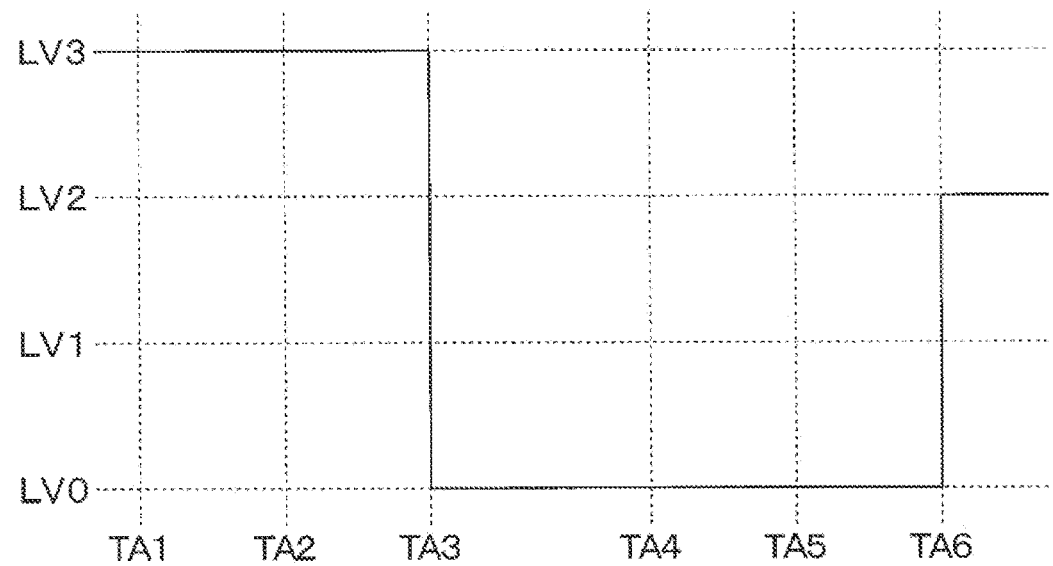
FIG. 24 is a time chart illustrating the transition of autonomous driving levels according to the seventh embodiment.

Similar to the example in FIG. 4, FIGS. 22 through 24 illustrate examples of transitioning from the automated driving (level 3) as the high autonomous driving level to level 2 as the middle autonomous level. In FIGS. 22 through 24, each of TA1 through TA6 corresponds to the time and indicates the passage of time. The examples in FIGS. 22, 23, and 24 are equal in the subject vehicle's travel path and traveling situation (such as vehicle speed) and differ from each other only in durations of the automated driving in progress at time TA1. FIG. 22 illustrates an example in which the automated driving requires a short duration, namely, shorter than a predetermined time. FIGS. 22 and 23 illustrate examples in which the automated driving requires a duration longer than or equal to a predetermined time. The duration of the automated driving according to the example in FIG. 23 is shorter than an example in FIG. 24.

Times TA1 through TA6 are defined as follows. Changeover request start time TA1 denotes the time to start the driving changeover request. The driving changeover request includes allowing the front display device to provide the transition-related display and the action instruction display. Changeover request start time TA1 is comparable to action instruction timing to allow the HMI device 20 to provide the action instruction display (at least the main action instruction display). Therefore, changeover request start time TA1 is similar to display start time T11 in FIG. 4. Changeover start time TA2 denotes the time when the driver starts the driving changeover operation in response to the driving changeover request. Changeover start time TA2 is similar to driving changeover start time T12 in FIG. 4. Changeover termination time TA3 denotes the time to terminate the driver's driving changeover operation started at changeover start time TA2. Changeover termination time TA3 is similar to driving changeover operation termination time T13 in FIG. 4. Endpoint passing time TA4 denotes the time when the subject vehicle reaches the end of the automated-driving road section. Endpoint passing time TA4 is similar to time T14 in FIG. 4. For ease of explanation, FIGS. 22 through 24 are drawn so that the time axis as the horizontal axis is almost equally spaced and endpoint passing time TA4 is located at the same position in the horizontal direction. Approval period start time TA5 enables the driver to perform the approval operation. Approval period start time TA5 is comparable to approval request timing that allows the HMI device 20 to provide the approval request display, for example. Alternatively, approval period start time TA5 is comparable to approval permission timing that permits an input operation to approve the implementation of the middle autonomous level. Transition time TA6 denotes the approval implementation timing when the driver performs an approval operation to implement the middle autonomous level. Transition time TA6 is similar to time T15 in FIG. 4.

When the automated driving requires a short duration, it is likely that the driver's driving awareness does not decrease so much compared to the state before the start of the automated driving, and a sense of driving manipulation (such as a response to the steering amount) is not lost. When the automated driving requires a longer duration, however, it is likely that the driving awareness decreases, and the driving manipulation sense is lost. As the automated driving requires a longer duration, it is favorable to force the driver to take the driving attitude corresponding to a lower autonomous driving level so that the driver can effectively regain the driving awareness and the driving manipulation sense. According to the present embodiment, the automation level determining portion 184 settles the mode of change in the autonomous driving level, transitioning from the high autonomous driving level to the middle autonomous level, depending on the duration of the high autonomous driving level.

As illustrated in FIG. 22, suppose the high autonomous driving level requires a duration shorter than the predetermined time. Then, the automation level determining portion 184 transitions from the high autonomous driving level to the middle autonomous level without transitioning to the low autonomous driving level. The automation level determining portion 184 settles an autonomous driving level at the low autonomous driving level depending on the duration of the high autonomous driving level. In more detail, FIG. 24 illustrates an example where the automated driving requires a relatively long duration. In this example, it is assumed that the degree of a decrease in the driving awareness and a loss of the driving manipulation sense is larger than the example in FIG. 23 where the automated driving duration is not so long. Concerning the example in FIG. 24, it is effective to force the driver to experience the manual driving at level 0, the lower autonomous driving level, to greatly regain the driving awareness and the driving manipulation sense. Concerning the example in FIG. 23, a decrease to level 1 is expected to sufficiently regain the driving awareness and the driving manipulation sense. As the high autonomous driving level requires a longer duration, the automation level determining portion 184 lowers the autonomous driving level at the low autonomous driving level. The increased automated driving period increases the possibility that the driver may lose the driving awareness and/or the driving manipulation sense. In such a case, a long preparatory period can be ensured so that the driver can regain the driving awareness and/or the driving manipulation sense at the end of the automated driving.

According to the present embodiment, the display command transmission portion 186 or the display control portion 255 sets the action instruction timing, namely, changeover request start time TA1, depending on the duration of the high autonomous driving level. As the automated driving duration increases, changeover request start time TA1 is set early. See FIGS. 22 through 24. Endpoint passing time TA4, approval period start time TA5, and transition time TA6 are almost the same or show little differences as illustrated in FIGS. 22 through 24. Meanwhile, changeover request start time TA1 occurs the latest in the example of FIG. 22 illustrating the shortest automated driving duration and occurs the earliest in the example of FIG. 24 illustrating the longest automated driving duration. An increase in the automated driving period can ensure a long time interval between changeover request start time TA1 and endpoint passing time TA4. The time interval is available as a preparatory period for the driver to regain the driving awareness and/or the driving manipulation sense during the transition from the high autonomous driving level to the middle autonomous level. According to the present embodiment, an increase in the automated driving period can ensure as long a preparatory period as possible for the driver to regain the driving awareness and/or the driving manipulation sense when the automated driving terminates.

As illustrated in FIGS. 22 through 24, the present embodiment increases the time interval from changeover request start time TA1 to approval period start time TA5 in accordance with an increase in the high autonomous driving level duration. Suppose changeover request start time TA1 to be a base point in time. Approval period start time TA5 based on the base point in time occurs later as the high autonomous driving level duration increases. The present embodiment provides the approval request timing or the approval permission timing specified by approval period start time TA5 according to the high autonomous driving level duration. An increase in the automated driving duration can ensure as long a preparatory period as possible for the driver to regain the driving awareness and/or the driving manipulation sense when the automated driving terminates.

FIGS. 22 through 24 are drawn to equally position approval period start time TA5 and transition time TA6 in the horizontal direction. However, the present embodiment is not limited thereto. For example, the time interval from endpoint passing time TA4 to approval period start time TA5 can increase as the high autonomous driving level duration increases. In other words, the horizontal axis positions corresponding to approval period start time TA5 and transition time TA6 in FIG. 23 can be changed further to the right of the horizontal axis positions corresponding to approval period start time TA5 and transition time TA6 in FIG. 22. Similarly, the horizontal axis positions corresponding to approval period start time TA5 and transition time TA6 in FIG. 24 can be changed further to the right of the horizontal axis positions corresponding to approval period start time TA5 and transition time TA6 in FIG. 23.

Eighth Embodiment

The description below explains the eighth embodiment by reference to FIGS. 25 and 26. The contents of times TA1 through TA6 in FIGS. 25 and 26 are similar to those in FIGS. 22 through 24.

According to the present embodiment, the in-vehicle system 10 including the driving control device 18 can perform automated driving at levels 3 and 4. The in-vehicle system 10 according to the present embodiment is configured similarly to the first embodiment, for example, except for operation modes concerning the autonomous driving levels and corresponding functional configurations.

During automated driving at level 4, the operations automation system responds to difficulties in continuing the level such as an obstacle on the road or an occurrence of roadwork. During automated driving at level 4, the driver is not requested to appropriately respond to a driving changeover request from the operations automation system. The driver can sleep while the level-4 automated driving is in progress. However, the driver needs to appropriately respond to a driving changeover request from the operations automation system when it is difficult to continue the level-3 automated driving. The driver needs to be awakened to be able to appropriately respond to a driving changeover request from the operations automation system while the level-3 automated driving is in progress.

Figures 25, 26:
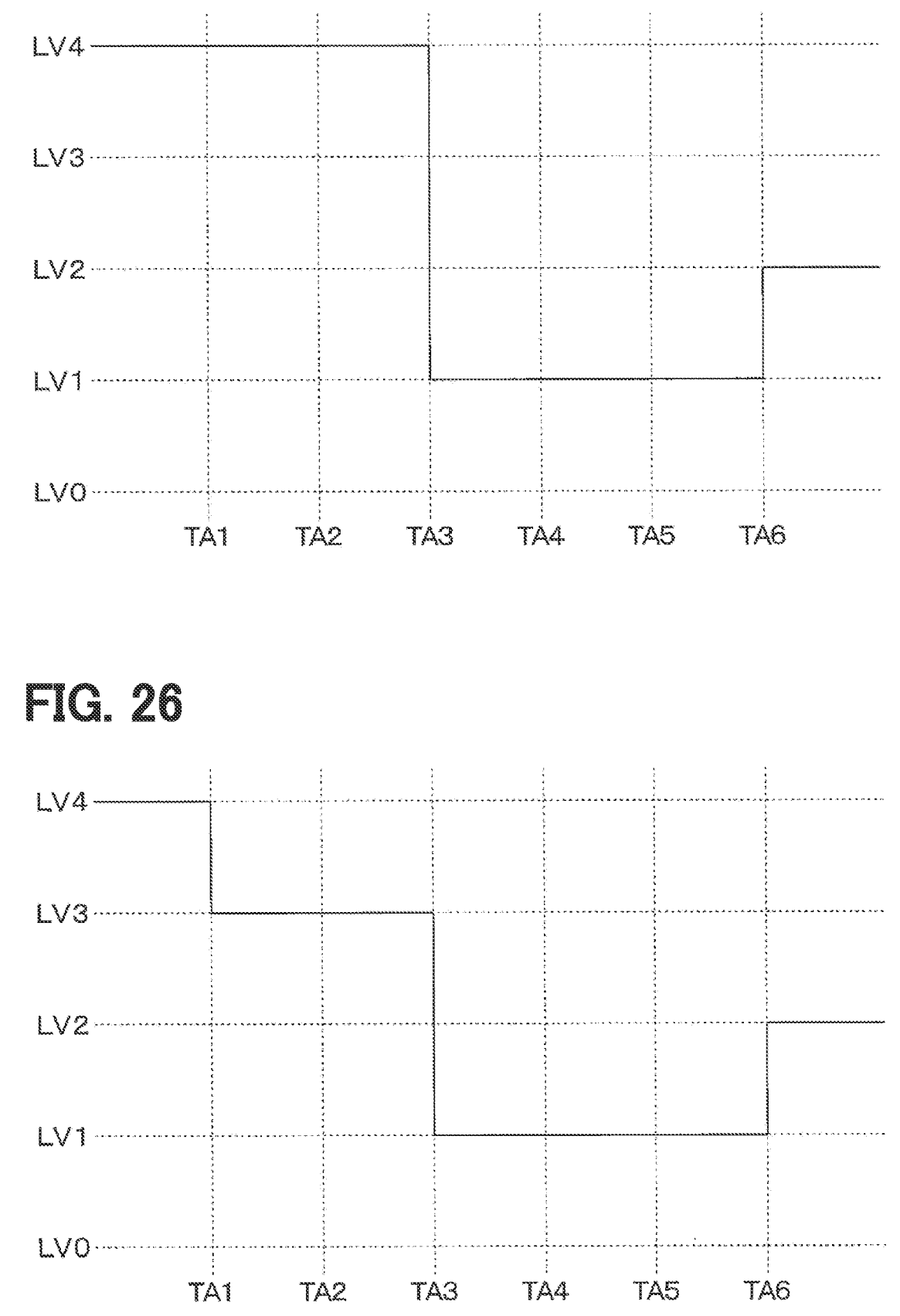

The examples in FIGS. 25 and 26 are equal in the subject vehicle's travel path and traveling situation and differ from each other only in the driver's states during the automated driving. FIG. 25 illustrates a case where the driver is awakened during the level-4 automated driving before changeover request start time TA1. FIG. 26 illustrates a case where the driver sleeps during the level-4 automated driving.

Both levels 3 and 4 are feasible in the "specific definite domain" or the automated-driving road section. It is necessary to request the driver to change driving by keeping the sufficient time until the end of the automated-driving road section is reached. It is assumed that the driver after sleep (or awakened from sleep) decreases the driving awareness and/or driving manipulation ability compared to the state before the automated driving capable of sleeping starts. The decrease in the driving manipulation ability includes the loss of the driving manipulation sense described above. It is assumed that the driving awareness and/or driving manipulation ability significantly decreases immediately after waking up from sleep.

The driver state detection portion 17 detects whether the driver sleeps during the operation at the high autonomous driving level. The automation level determining portion 184 settles the mode of change in the autonomous driving level, transitioning from the high autonomous driving level to the middle autonomous driving level, depending on whether the driver sleeps during the operation at the high autonomous driving level. If the driver sleeps while implementing level 4 as the high autonomous driving level, the automation level determining portion 184 terminates the high autonomous driving level earlier than when the driver state is a non-sleeping state.

In more detail, suppose the driver does not sleep during the automated driving at level 4 as the high autonomous driving level. As illustrated in FIG. 25, level 4 is maintained until changeover termination time TA3. At changeover termination time TA3, the autonomous driving level transitions from level 4 to level 1. At transition time TA6, the autonomous driving level transitions from level 1 to level 2. This transition mode is similar to the level transition mode according to the example in FIG. 4 illustrating the transition from the automated driving to level 1 as the low autonomous driving level and then to level 2 as the middle autonomous driving level.

Suppose the driver sleeps during the level-4 automated driving. Level 4 terminates at changeover request start time TA1 as illustrated in FIG. 26. The autonomous driving level temporarily transitions to level 3 as a sub-high autonomous driving level. The sub-high autonomous driving level is an autonomous driving level included in the automated driving between the high autonomous driving level and the middle autonomous level. The sub-high autonomous driving level corresponds to level 3 in the example of FIG. 26. The autonomous driving level is maintained at level 3 from changeover request start time TA1 to changeover termination time TA3. The driving changeover operation is performed at level 3. At changeover termination time TA3, the autonomous driving level transitions from level 3 to level 1. At transition time TA6, the autonomous driving level transitions from level 1 to level 2. The autonomous driving level is set to level 3 from changeover start time TA2 to changeover termination time TA3, which indicates the period of operation allowing the driver state to transition to the low-level associated state corresponding to level 1. After sleeping during the level-4 automated driving, the driver can be allowed to gradually take an appropriate driving attitude during the level-3 automated driving without being forced to directly transition to a driving attitude corresponding to level 1.

According to the present embodiment, if the driver sleeps during the implementation of the high autonomous driving level, the automation level determining portion 184 transitions from the high autonomous driving level to the sub-high autonomous driving level, and then to the low autonomous driving level. If the driver does not sleep during the implementation of the high autonomous driving level, the automation level determining portion 184 transitions to the low autonomous driving level without transitioning from the high autonomous driving level to the sub-high autonomous driving level. It is possible to appropriately provide control over shifting the autonomous driving levels depending on whether the driver sleeps during the automated driving so that the driver can regain the driving awareness and/or driving manipulation ability at the end of the automated driving.

Ninth Embodiment

Figure 27:
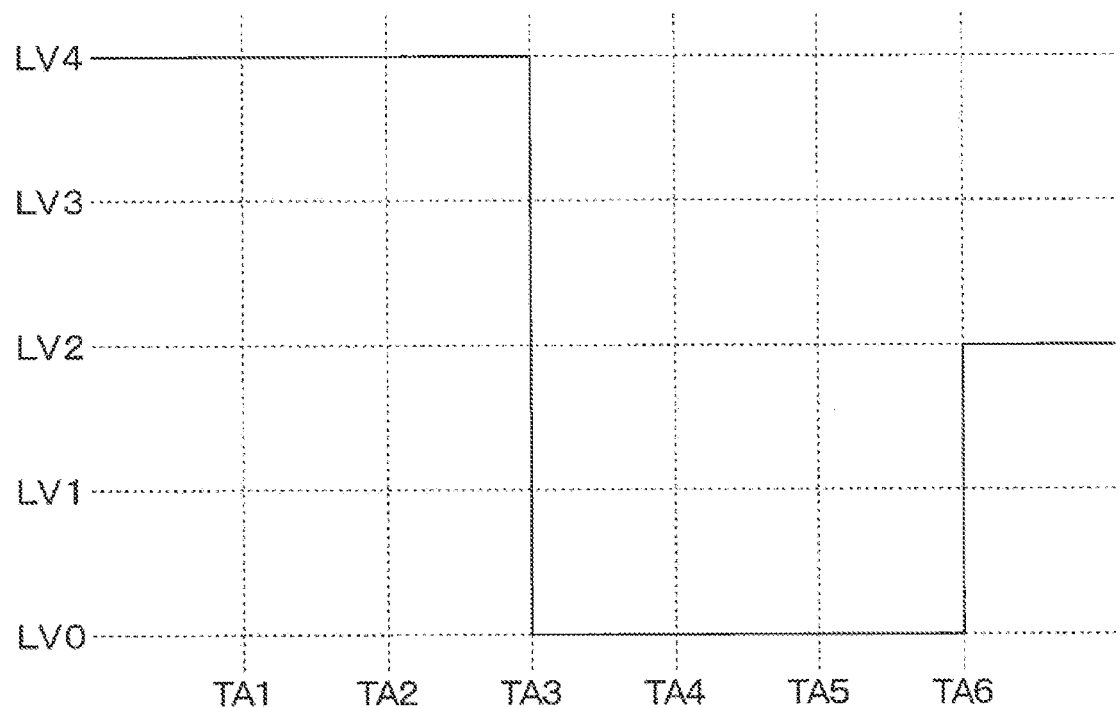
FIG. 27 is a time chart illustrating the transition of autonomous driving levels according to the ninth and tenth embodiments.

The description below explains the ninth embodiment by reference to FIGS. 26 and 27. The contents of times TA1 through TA6 in FIGS. 26 and 27 are similar to those in FIGS. 25 and 26. The present embodiment is a partial modification of the eighth embodiment. According to the present embodiment, the mode illustrated in FIG. 27 is modified from the mode of transition between autonomous driving levels in the example of FIG. 25 according to the eighth embodiment.

The examples in FIGS. 26 and 27 are equal in the subject vehicle's travel path and traveling situation and differ from each other only in the driver's states during the automated driving. FIG. 26 illustrates a case where the driver sleeps during the level-4 automated driving before changeover request start time TA1. FIG. 27 illustrates a case where the driver does not sleep during the level-4 automated driving.

As above, it is assumed that the driver after sleep decreases the driving awareness and/or driving manipulation ability compared to the state before the automated driving starts. When not sleeping during the automated driving, the driver can respond to lower autonomous driving levels compared to the sleeping state.

According to the present embodiment, the automation level determining portion 184 settles the autonomous driving level at the low autonomous driving level depending on whether the driver sleeps during the operation at the high autonomous driving level. Suppose the driver sleeps during the automated driving at level 4 as the high autonomous driving level. Then, the low autonomous driving level between changeover termination time TA3 and transition time TA6 is set to level 1 as illustrated in FIG. 26. Suppose the driver does not sleep during the automated driving at level 4 as the high autonomous driving level. Then, the low autonomous driving level is set to level 0 as illustrated in FIG. 27. It is possible to appropriately provide control over shifting the autonomous driving levels depending on whether the driver sleeps during the automated driving so that the driver can regain the driving awareness and/or driving manipulation ability at the end of the automated driving.

Tenth Embodiment

Figure 28:
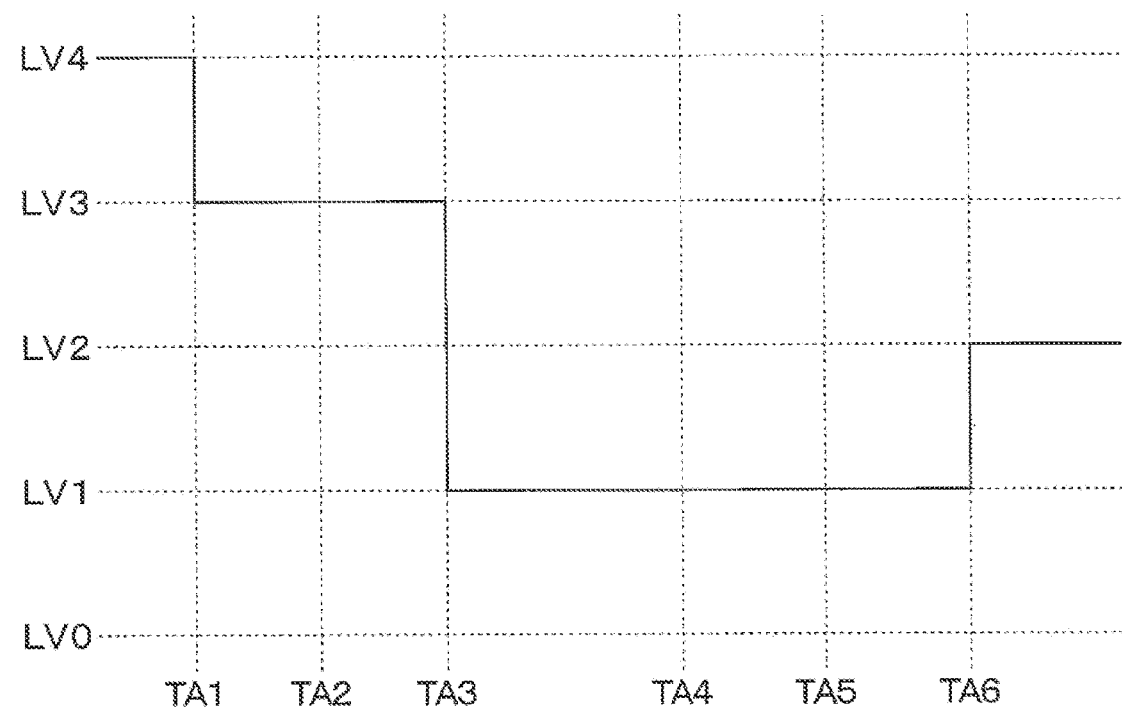
FIG. 28 is a time chart illustrating the transition of autonomous driving levels according to the tenth embodiment.

The description below explains the tenth embodiment by reference to FIGS. 27 and 28. The contents of times TA1 through TA6 in FIGS. 27 and 28 are similar to those in FIGS. 25 and 26. The present embodiment is a partial modification of the ninth embodiment. According to the present embodiment, the mode illustrated in FIG. 28 is modified from the mode of transition between autonomous driving levels in the example of FIG. 26 according to the ninth embodiment.

The examples in FIGS. 27 and 28 are equal in the subject vehicle's travel path and traveling situation and differ from each other only in the driver's states during the automated driving. FIG. 27 illustrates the case where the driver does not sleep during the level-4 automated driving before changeover request start time TA1. FIG. 28 illustrates a case where the driver sleeps during the level-4 automated driving.

According to the present embodiment, the display command transmission portion 186 or the display control portion 255 settles the action instruction timing, namely, changeover request start time TA1 depending on whether the driver sleeps during the operation at the high autonomous driving level. Changeover request start time TA1 is set early when the driver sleeps during the operation at the high autonomous driving level. See FIGS. 27 and 28. Endpoint passing time TA4, approval period start time TA5, and transition time TA6 are almost the same or show little differences as illustrated in FIGS. 27 through 28. However, changeover request start time TA1 in the example of FIG. 28 occurs earlier than the example of FIG. 27. FIG. 28 shows the example where the driver sleeps during the operation at the high autonomous driving level. When the automated driving terminates, it is possible to ensure as long a preparatory period as possible for the driver to regain the driving awareness and/or the driving manipulation sense decreased due to sleeping during the automated driving.

The present embodiment configures a long time interval from changeover request start time TA1 to approval period start time TA5 when the driver sleeps during the operation at the high autonomous driving level. Suppose changeover request start time TA1 to be a base point in time. Approval period start time TA5 based on the base point in time occurs later as the high autonomous driving level duration increases. The present embodiment provides the approval request timing or the approval permission timing specified by approval period start time TA5 depending on whether the driver sleeps during the operation at the high autonomous driving level. When the automated driving terminates, it is possible to ensure as long a preparatory period as possible for the driver to regain the driving awareness and/or the driving manipulation sense decreased due to sleeping during the automated driving.

FIGS. 27 and 28 are drawn to equally position approval period start time TA5 and transition time TA6 in the horizontal direction. However, the present embodiment is not limited thereto. For example, the time interval from endpoint passing time TA4 to approval period start time TA5 depends on whether the driver sleeps during the operation at the high autonomous driving level. In other words, the horizontal axis positions corresponding to approval period start time TA5 and transition time TA6 in FIG. 28 can be changed further to the right of the horizontal axis positions corresponding to approval period start time TA5 and transition time TA6 in FIG. 27.

Eleventh Embodiment

The seventh through tenth embodiments concern the transition of actual autonomous driving levels between the high autonomous driving level and the middle autonomous level from changeover request start time TA1 to transition time TA6. However, the seventh through tenth embodiments may be applied to the superficial transition of autonomous driving levels similar to the fourth embodiment, for example.

The mode of transition between autonomous driving levels illustrated in FIGS. 23 through 28 may conform to a "superficial" transition based on the information presentation through the use of the HMI device 20. In this case, the actual autonomous driving level is determined and implemented by the automation level determining portion 184 and transitions from the automated driving to level 2 at changeover termination time TA3 according to the mode illustrated in FIG. 22. Functional configurations or operations of the automation level determining portion 184 and/or the display command transmission portion 186 according to the above-described embodiments can be replaced by the same of the display control portion 255.

Modifications

The present disclosure is not limited to the above-described embodiments. The embodiments can be modified as appropriate. Typical modifications are described below. The description of the modifications mainly explains differences from the above-described embodiments. The mutually equal or comparable parts in the embodiments and modifications are designated by the same reference numerals. Unless there are technical contradictions or additional explanations, the description of the embodiments may be appropriately applied to the description of the following modifications in terms of the components designated by the same reference numerals as those in the embodiments.

The present disclosure is not limited to the specific device configurations described in the embodiments. For example, the vehicle 1 including the in-vehicle system 10 is not limited to normal passenger automobiles. The vehicle 1 may be a large vehicle such as a freight truck. The number of wheels is not limited and may be applied to three-wheeled vehicles or six-wheeled or eight-wheeled vehicles such as freight trucks. Types of the vehicle 1 may include not only a conventional vehicle using only an internal combustion engine but also an electric vehicle or a fuel cell vehicle not using an internal combustion engine or a so-called hybrid vehicle. In terms of the body shape and structure, the vehicle 1 is not limited to being box-like, namely, approximately rectangular in a plan view. There are no limitations on the usage of the vehicle 1, the position of the steering wheel 8, and the number of occupants, for example.

Communication standards applicable to the in-vehicle system 10 may include not only CAN (international registered trademark) but also FlexRay (international registered trademark), for example. Communication standards applicable to the in-vehicle system 10 are not limited to one type. For example, the in-vehicle system 10 may include a sub-network line compliant with a communication standard such as LIN. LIN stands for Local Interconnect Network.

The vehicle state sensor 11, the outside state sensor 12, and the perimeter monitoring sensor 13 are also not limited to the above-described examples. For example, the perimeter monitoring sensor 13 may include a sonar, namely, an ultrasonic sensor. Alternatively, the perimeter monitoring sensor 13 may include two or more types of sensors such as millimeter wave radar sensor, submillimeter wave radar sensor, laser radar sensor, and ultrasonic sensor. There is no limitation on the number of sensors installed.

The locator 14 is also not limited to the above-described examples. For example, the locator 14 may not internally include a gyro sensor and an acceleration sensor. Specifically, the inertia acquisition portion 142 may receive signals output from the angular velocity sensor and the acceleration sensor as the vehicle state sensor 11 provided outside the locator 14.

The DCM 15 can be omitted. The navigation device 16 can acquire traffic information. Alternatively, the navigation device 16 may include the locator 14 and the DCM 15.

The navigation device 16 may be connected to the HMI control device 25 to be capable of information communication via a sub-communication line different from the onboard communication line 10A.

The navigation device 16 may include a display screen dedicated to the navigation display in addition to the HMI device 20. Alternatively, the navigation device 16 may configure part of the HMI device 20. For example, the navigation device 16 may be integrated with the CID device 23.

The driver state detection portion 17 may be connected to the HMI control device 25 to be capable of information communication via a sub-communication line different from the onboard communication line 10A.

The driver state detection portion 17 is not limited to the configuration including the visual line detection portion 171, the posture detection portion 172, and the manipulation state detection portion 173. For example, image recognition using the configuration of the visual line detection portion 171 can provide the function corresponding to the posture detection portion 172. The driver state detection portion 17 may include a biometric information sensor that detects biometric information such as the driver's pulse. In this case, a component of the biometric information sensor, such as a detection electrode, can be shared with the component of the manipulation state detection portion 173 to detect the holding state of the steering wheel 8.

The above-described embodiments configure the driving control device 18 to be able to perform the vehicle control operations corresponding to levels 1 through 3. However, the present disclosure is not limited thereto. For example, the present disclosure may also be suitably applied to cases capable of performing vehicle control operations corresponding to levels 1 through 5.

The levels or categories of driving automation in the present disclosure are also not limited to those specified in "SAE J3016." "SAE J3016" increases level values as the autonomous driving level increases. However, the disclosure is not limited thereto. For example, the disclosure may also apply to a standard that increases level values as the autonomous driving level decreases based on the highest autonomous driving level defined as "level 1."

The HMI device 20 is not limited to the configuration including the meter panel 21, the HUD device 22, and the CID device 23. For example, the meter panel 21 and the CID device 23 can be integrated.

One display device can provide the meter 211 and meter display 212. In this case, the meter 211 may be provided as display areas at the right and left ends in one display device such as a liquid crystal display or an organic EL display. The meter 211 can be embodied by displaying images of a bezel, a pointer, and a scale corresponding to a tachometer, a speedometer, and a water temperature gauge, for example. The meter display 212 may be provided as a display area other than the meter 211 in such a display device.

The input device 232 may include a handheld pointing device, for example, operated by the driver in place of or in addition to the touch panel overlaid on the CID display 231. The input device 232 may include a voice input device that detects the driver's utterance.

According to the embodiments, the driving control device 18 and the HMI control device 25 are configured as a so-called onboard microcomputer including a CPU and others. However, the present disclosure is not limited thereto.

For example, all or part of the driving control device 18 may include a digital circuit, such as ASIC or FPGA, configured to be capable of the above-described operations. ASIC stands for Application Specific Integrated Circuit. FPGA stands for Field Programmable Gate Array. The onboard microcomputer part and the digital circuit part can coexist in the driving control device 18. The same applies to the HMI control device 25.

A program according to the present disclosure enables various operations, procedures, or processes described in the embodiments and may be downloaded or upgraded via the V2X communication through the use of DCM 15, for example. V2X stands for Vehicle to X. Alternatively, such a program may be downloaded or upgraded through the use of a terminal device installed in the manufacturing plant, maintenance plant, or dealer of the vehicle 1, for example. The program may be stored in a memory card, an optical disk, or a magnetic disk, for example.

The above-described functional configurations and methods may be embodied by a dedicated computer that is provided by configuring a processor and memory programmed to execute one or more functions embodied by a computer program. Alternatively, the functional configurations and methods may be embodied by a dedicated computer that is provided by configuring a processor using one or more dedicated hardware logic circuits. Alternatively, the functional configurations and methods may be embodied by one or more dedicated computers configured as a combination of a processor and memory programmed to execute one or more functions and a processor comprised of one or more hardware logic circuits. A computer-readable non-transitory tangible storage medium may store the computer program as an instruction executed by a computer. The functional configurations and methods can be also represented as a computer program including procedures for embodying those, or as a non-transitory tangible storage medium to store the program.

The present disclosure is not limited to the specific functional configurations and example operations described in the above-described embodiments. According to the embodiments, for example, the system-based and/or display-based autonomous driving levels conform to the transition modes such as 3-0-2, 3-0-1, 3-1-2, 4-0-2, and 4-1-2 in compliance with the autonomous driving levels specified in "SAE J3016." However, the disclosure is not limited thereto. For example, it may be favorable to use a transition mode such as 4-0-1 or 5-2-3. The transition mode defined as LA-LB-LC may satisfy the condition of LA≥3, LB≤2, and LA>LC>LB.

According to the above-described embodiments, the CID device 23 provides displays to guide the visual line and direct the operations. However, the disclosure is not limited thereto. For example, the terminal device 24 may provide the displays. The HMI control device 25 may present various displays on the display screen of the terminal device 24.

The visual line guidance display GA may be displayed in the screen area DA2, namely, the second task screen display area in the CID display 231. The display modes such as the visual line guidance display GA are not limited to the examples described in the embodiments. For example, the visual line guidance display GA may be represented similarly to a meteor or a comet moving in the visual line guidance direction.

In the example of FIG. 8, the in-vehicle system 10 may selectively provide only the break suggestion or MRM as a specified emergency process according to the road conditions. Alternatively, the in-vehicle system 10 may first provide the break suggestion and then MRM. The in-vehicle system 10 may provide MRM if the driver receives the break suggestion and, after a lapse of the specified time, does not take the driving attitude corresponding to level 2 or perform any operation in response to the break suggestion. The specified emergency process is not limited to specific contents.

In the examples of FIGS. 4 and 9, the autonomous driving level transitions from the high autonomous driving level, namely, level 3, to the low autonomous driving level, namely, level 0 or 1. The transition timing can be changed from the driving changeover operation termination timing (time T13). Specifically, the transition timing may be set appropriately between times T13 and T14, namely, between the driving changeover operation termination timing and the timing corresponding to the end of the automated-driving road section.

In the examples of FIG. 15, the actual autonomous driving level transitions from the high autonomous driving level, namely, level 3, to the middle autonomous level, namely, level 2. The transition timing can be changed from the driving changeover operation termination timing (time T43). Specifically, the transition timing may be set appropriately between times T43 and T44. The same applies to the example of FIG. 17 and others.

Similar expressions such as "acquisition," "calculation," "estimation," "detection," and "settlement" are interchangeable as appropriate while technical consistency is ensured. Both "detection" and "extraction" are also interchangeable as appropriate while technical consistency is ensured.

The elements constituting the embodiments are not necessarily required except when the elements are explicitly stated to be required or are apparently considered to be required in principle. The present disclosure is not limited to the described numerical values such as the number of composing elements, quantities, or ranges, for example, unless explicitly stated as being required and the disclosure is apparently limited to specific numerical values in principle. Similarly, the present disclosure is not limited to the described specific shapes, directions, or positional relationships of the composing elements, for example, unless explicitly stated as being required and the disclosure is apparently limited to the specific shapes, directions, or positional relationships of the composing elements, for example, in principle.

Modifications are also not limited to the above-described examples. For example, all or part of one of the embodiments and all or part of another can be combined while technical consistency is ensured. The number of combinations is not limited. Similarly, all or part of one of the modifications and all or part of another can be combined while technical consistency is ensured. All or part of the embodiments and all or part of the modifications can be combined while technical consistency is ensured. In other words, the embodiments and the modifications can be optionally combined while technical consistency is ensured.

Overview

The present disclosure explained by the embodiments and the modifications includes the following aspects concerning the HMI control method and the HMI control program. The aspects can be mutually combined while technical consistency is ensured.

The HMI control method controls an HMI device (20) that visually displays images to be able to be viewed by the driver of a vehicle (1) capable of automated driving. The HMI control program is executed by an HMI control device (25) configured to control the HMI device (20) that visually displays images to be able to be viewed by the driver of the vehicle (1) capable of automated driving.

According to a first aspect, the HMI control method and processes performed by the HMI control device include an automation level acquisition process and a display control process.

The automation level acquisition process acquires a resultant autonomous driving level settled by a driving control device (18) that controls the driving of the vehicle.

The display control process controls image display operations for the HMI device according to the autonomous driving level acquired by the automation level acquisition process.

When a high autonomous driving level as the autonomous driving level included in the automated operation terminates, the display control process allows the HMI device to provide an action instruction display that causes the driver to take a low-level associated state as a driver state, namely, a state of the driver. The low-level associated state is capable of a low autonomous driving level, namely, the autonomous driving level at which an in-vehicle system (10) including the driving control device does not provide at least lateral motion control based on steering or longitudinal motion control based on acceleration/deceleration.

According to a second aspect, the display control process allows the HMI device to provide the action instruction display that causes the driver to take the low-level associated state when the high autonomous driving level terminates to transition to a middle autonomous level, namely, the autonomous driving level between the high autonomous driving level and the low autonomous driving level.

According to a third aspect, the HMI control method and processes performed by the HMI control device further include a driver state acquisition process and an operation acceptance process.

The driver state acquisition process acquires the driver state.

The operation acceptance process accepts an input operation by the driver.

When the driver state acquired by the driver state acquisition process stabilizes at the low-level associated state, the display control process allows the HMI device to provide an approval request display prompting the input operation to approve the implementation of the middle autonomous level.

According to a fourth aspect, the display control process settles a duration of the high autonomous driving level, approval request timing, or approval permission timing. The approval request timing causes the HMI device to provide the approval request display depending on whether the driver state represents sleeping during the implementation of the high autonomous driving level. The approval permission timing permits the input operation to approve the implementation of the middle autonomous level.

According to a fifth aspect, the display control process settles the autonomous driving level at the low autonomous driving level depending on the cause of terminating the high autonomous driving level, According to a sixth aspect, the display control process settles the autonomous driving level at the low autonomous driving level depending on the duration of the high autonomous driving level or depending on whether the driver state represents sleeping during the implementation of the high autonomous driving level.

According to a seventh aspect, the display control process sets an action instruction timing to provide the action instruction display on the HMI device depending on the duration of the high autonomous driving level or depending on whether the driver state represents sleeping during the implementation of the high autonomous driving level.

According to an eighth aspect, the display control process allows the HMI device to provide a main action instruction display and a sub-action instruction display as the action instruction display. The main action instruction display instructs for taking a main action including an action to adjust a driving posture as the driver state. The sub-action instruction display instructs for taking a sub-action including an action to adjust a driving awareness as the driver state.

According to a ninth aspect, the display control process causes a visual line guidance display to be provided on a display device (23) displaying a second task screen that displays a second task the driver can perform during the automated driving. The visual line guidance display guides a visual line of the driver from the second task screen to a front display device (21, 22) provided for the vehicle toward a traveling direction referring to the driver.

According to a tenth aspect, the front display device is available as a head-up display device (22).

According to an eleventh aspect, the low autonomous driving level corresponding to the action instruction display is the superficial autonomous driving level different from the autonomous driving level. The driving control device actually implements the autonomous driving level between the end of the high autonomous driving level and the beginning of the middle autonomous level.

The present disclosure explained by the embodiments and the modifications includes the following aspects concerning the driving control method and the driving control program. The aspects can be mutually combined while technical consistency is ensured.

The driving control method controls the driving of a vehicle (1) capable of automated driving. The driving control program is executed by a driving control device (18) configured to control the driving of the vehicle (1) capable of automated driving.

According to a first aspect, the driving control method and processes performed by the driving control device include a traveling situation acquisition process and an automation level settlement process.

The traveling situation acquisition process acquires traveling situations of the vehicle.

The automation level settlement process settles an autonomous driving level based on the traveling situation acquired by the traveling situation acquisition process.

The automation level settlement process terminates a high autonomous driving level as the autonomous driving level included in the automated operation, once transitions to a low autonomous driving level as the autonomous driving level lower than the middle autonomous level, and then transitions to a middle autonomous level as the autonomous driving level lower than the high autonomous driving level.

According to a second aspect, there is further provided an operation state determination process that determines the driving manipulation state of the driver.

The automation level settlement process permits the implementation of the middle autonomous level under the condition that the operation state determination process determines that the driving manipulation state corresponding to the low autonomous driving level stabilizes.

According to a third aspect, the automation level settlement process settles the autonomous driving level at the low autonomous driving level depending on the cause of terminating the high autonomous driving level.

According to a fourth aspect, the automation level settlement process settles the mode of changes in the autonomous driving level during the transition from the high autonomous driving level to the middle autonomous level depending on the duration of the high autonomous driving level or depending on whether the driver state represents sleeping during the implementation of the high autonomous driving level.

According to a fifth aspect, the automation level settlement process settles the autonomous driving level at the low autonomous driving level depending on the duration of the high autonomous driving level or depending on whether the driver state represents sleeping during the implementation of the high autonomous driving level.

According to a sixth aspect, the automation level settlement process terminates the high autonomous driving level earlier in the driver state of sleeping than in a non-sleeping state during implementation of the high autonomous driving level.

According to a seventh aspect, the automation level settlement process temporarily transitions from the high autonomous driving level to the sub-high autonomous driving level, and then transitions to the low autonomous driving level when the driver state represents sleeping during the implementation of the high autonomous driving level. The sub-high autonomous driving level is the autonomous driving level between the high autonomous driving level and the middle autonomous level and is included in the automated operation.

The automation level settlement process transitions from the high autonomous driving level to the low autonomous driving level without transitioning to the sub-high autonomous driving level when the driver state represents non-sleeping during the implementation of the high autonomous driving level.

According to an eighth aspect, the automation level settlement process transitions from the high autonomous driving level to the middle autonomous level without transitioning to the low autonomous driving level when the duration is shorter than a specified time.

According to a ninth aspect, the driving control method and processes performed by the driving control device further include a display command transmission process that transmits display command information to an HMI control device (25) controlling the HMI device so that an HMI device (20) provides a transition-related display concerning the transition of the autonomous driving level.

According to a tenth aspect, the display command transmission process transmits the display command information allowing the HMI device to provide an approval request display that prompts the driver to perform an input operation to approve the implementation of the middle autonomous level when the driving manipulation state corresponding to the low autonomous driving level stabilizes.

According to an eleventh aspect, the display command transmission process settles approval request timing to display the approval request display on the HMI device or approval permission timing to allow the input operation to approve the implementation of the middle autonomous level depending on the duration of the high autonomous driving level or depending on whether the driver state represents sleeping during the implementation of the high autonomous driving level.

According to a twelfth aspect, the display command transmission process transmits the display command information allowing the HMI device to provide a main action instruction display and a sub-action instruction display. The main action instruction display directs a main action including adjustment of a driving posture as a driver state, which is the state of the driver. The sub-action instruction display directs a sub-action including adjustment of driving awareness as the driver state.

According to a thirteenth aspect, the display command transmission process sets an action instruction timing to provide the main action instruction display on the HMI device depending on the duration of the high autonomous driving level or depending on whether the driver state represents sleeping during the implementation of the high autonomous driving level.

According to a fourteenth aspect, the driving control method and processes performed by the driving control device further include a driver state acquisition process and a vehicle control process.

The driver state acquisition process acquires the driver state.

The vehicle control process provides motion control over steering or acceleration/deceleration in the vehicle based on the autonomous driving level settled by the automation level settlement process.

The vehicle control process provides predetermined safety stop control when the main action is not performed.

When the main action is performed but the sub-action is not performed, the vehicle control process does not provide the safety stop control. Meanwhile, the display command transmission process transmits the display command information allowing the HMI device to provide a warning display.

According to a fifteenth aspect, the display command transmission process transmits the display command information allowing a display device (23) to provide a visual line guidance display. The visual line guidance display guides the driver's visual line from a second task screen to a front display device (21, 22) provided for the vehicle toward a traveling direction referring to the driver. The display device displays the second task screen to display a second task the driver can perform during the automated driving.

According to a sixteenth aspect, the front display device is a head-up display device (22).

According to a seventeenth aspect, a non-transitory computer readable medium stores a program for an HMI control device configured to control an HMI device that displays an image visibly recognized by a driver of a vehicle capable of performing automated driving. The program comprises instructions, when executed by the HMI control device, causing the HMI control device to:
  acquire an autonomous driving level determined by a driving control device that is configured to control an operation of the vehicle;
  control an image display operation of the HMI device according to the acquired autonomous driving level; and
  when terminating a high autonomous driving level as the autonomous driving level under the automated driving, control the HMI device to provide an action instruction display that instructs the driver to take a low-level associated state as a driver state so as to handle a low autonomous driving level, wherein the low autonomous driving level is the autonomous driving level lower than the high autonomous driving level.

According to a eighteenth aspect, a non-transitory computer readable medium stores a program for a driving control device configured to control an operation of a vehicle capable of performing automated driving. The program comprises instructions, when executed by the driving control device, causing the driving control device to:

acquire a traveling situation of the vehicle;

determine an autonomous driving level based on the acquired traveling situation;

terminate a high autonomous driving level as the autonomous driving level under the automated driving;

temporarily transition to a low autonomous driving level as the autonomous driving level lower than a middle autonomous level; and then transition to the middle autonomous level as the autonomous driving level lower than the high autonomous driving level.

The invention claimed is:

1. An HMI control device configured to control an HMI device that displays an image visibly recognized by a driver of a vehicle, the vehicle being capable of performing automated driving, the HMI control device comprising:

an automation level acquisition portion that is configured to acquire an autonomous driving level determined based on a traveling situation acquired at least by a traveling situation acquisition portion by a driving control device that is configured to control an operation of the vehicle; and a display control portion that is configured to control an image display operation of the HMI device according to the autonomous driving level acquired by the automation level acquisition portion, wherein when terminating a high autonomous driving level as the autonomous driving level under the automated driving, the display control portion is configured to control the HMI device to provide an action instruction display that instructs the driver to take a low-level associated state as a driver state so as to handle a low autonomous driving level which is an autonomous driving level at which an in-vehicle system including the driving control device does not provide at least lateral motion control based on steering or longitudinal motion control based on acceleration/deceleration, the low autonomous driving level is the autonomous driving level lower than the high autonomous driving level and a middle autonomous level, and the display control portion is configured to control the HMI device to provide the action instruction display that instructs the driver to take the low-level associated state without actually transitioning the vehicle to the low autonomous driving level when terminating the high autonomous driving level and transitioning to the middle autonomous level as the autonomous driving level between the high autonomous driving level and the low autonomous driving level.

2. The HMI control device according to claim 1, further comprising:

a driver state acquisition portion that is configured to acquire the driver state; and a manipulation acceptance portion that is configured to accept an input operation by the driver, wherein the display control portion is configured to control the HMI device to provide an approval request display that prompts the input operation to approve starting of the middle autonomous level when the driver state acquired by the driver state acquisition portion stabilizes in the low-level associated state.

3. The HMI control device according to claim 2, wherein the display control portion is configured to set one of an approval request timing at which the approval request display is displayed on the HMI device and an approval permission timing at which the input operation to approve the start of the middle autonomous level is permitted based on one of a duration for which the high autonomous driving level is performed and a determination on whether the driver state is a sleeping state during the high autonomous driving level.

4. The HMI control device according to claim 1, wherein the display control portion is configured to set the autonomous driving level for the low autonomous driving level depending on a reason for terminating the high autonomous driving level.

5. The HMI control device according to claim 1, wherein the display control portion is configured to set the autonomous driving level for the low autonomous driving level based on one of a duration for which the high autonomous driving level is performed and a determination on whether the driver state is a sleeping state during the high autonomous driving level.

6. The HMI control device according to claim 1, wherein the display control portion is configured to set an action instruction timing at which the action instruction display is displayed on the HMI device based on one of a duration for which the high autonomous driving level is performed and a determination on whether the driver state is a sleeping state during the high autonomous driving level.

7. The HMI control device according to claim 1, wherein the display control portion is configured to control the HMI device to provide a main action instruction display and a sub-action instruction display as the action instruction display, the main action instruction display instructs for taking a main action including an action to adjust a driving posture as the driver state, and the sub-action instruction display instructs for taking a sub-action including an action to adjust a driving awareness as the driver state.

8. A driving control device configured to control an operation of a vehicle capable of performing automated driving, the driving control device comprising:

a traveling situation acquisition portion that is configured to acquire a traveling situation of the vehicle from various sensors as various information;

an automation level determining portion that is configured to determine an autonomous driving level based on the traveling situation acquired by the traveling situation acquisition portion; and a vehicle control portion that is configured to provide at least vehicle speed control, steering control, or braking control, according to the autonomous driving level settled by the automation level determining portion, wherein the automation level determining portion is configured to:

terminate a high autonomous driving level as the autonomous driving level under the automated driving;

temporarily transition to a low autonomous driving level as the autonomous driving level lower than a middle autonomous level and the high autonomous driving level; and then transition to the middle autonomous level as the autonomous driving level between the high autonomous driving level and the low autonomous driving level;

the automation level determining portion is further configured to set a mode of changing the autonomous driving level from the high autonomous driving level to the middle autonomous level based on one of a duration for which the high autonomous driving level is performed and a determination on whether a driver state of a driver of the vehicle is a sleeping state during the high autonomous driving level;

when the duration for which the high autonomous driving level is performed is shorter than a specified time, the automation level determining portion is further configured to transition from the high autonomous driving level to the middle autonomous level without transitioning to the low autonomous driving level.

9. The driving control device according to claim 8, further comprising:
a manipulation state determination portion that is configured to determine a driving manipulation state of the driver, wherein
the automation level determining portion is configured to permit start of the middle autonomous level when the manipulation state determination portion determines that the driving manipulation state for the low autonomous driving level stabilizes.

10. The driving control device according to claim 8, wherein
the automation level determining portion is configured to set the autonomous driving level for the low autonomous driving level depending on a reason for terminating the high autonomous driving level.

11. The driving control device according to claim 8, wherein
the automation level determining portion is configured to set the autonomous driving level for the low autonomous driving level based on one of the duration for which the high autonomous driving level is performed and the determination on whether the driver state is a sleeping state during the high autonomous driving level.

12. The driving control device according to claim 8, wherein
the automation level determining portion is configured to terminate the high autonomous driving level earlier when the driver state during the high autonomous driving level is the sleeping state than when the driver state during the high autonomous driving level is a non-sleeping state.

13. The driving control device according to claim 8, wherein
when the driver state of the driver of the vehicle is the sleeping state during the high autonomous driving level, the automation level determining portion is configured to:
temporarily transition from the high autonomous driving level to a sub-high autonomous driving level; and then
transition to the low autonomous driving level, the sub-high autonomous driving level is the autonomous driving level between the high autonomous driving level and the middle autonomous level and is included in the automated driving, and when the driver state of the driver of the vehicle is a non-sleeping state during the high autonomous driving level, the automation level determining portion is configured to transition from the high autonomous driving level to the low autonomous driving level without transitioning to the sub-high autonomous driving level.

14. The driving control device according to claim 8, further comprising:
a display command transmission portion that is configured to transmit display command information to an HMI control device that is configured to control an HMI device so that the HMI device provides a transition-related display concerning transition of the autonomous driving level.

15. The driving control device according to claim 14, wherein
when a driving manipulation state of the driver for the low autonomous driving level stabilizes, the display command transmission portion is configured to transmit the display command information that causes the HMI device to provide an approval request display that prompts the driver to perform an input operation to approve start of the middle autonomous level.

16. The driving control device according to claim 15, wherein
the display command transmission portion is configured to set one of an approval request timing at which the approval request display is displayed on the HMI device and an approval permission timing at which the input operation to approve start of the middle autonomous level is permitted based on one of a duration for which the high autonomous driving level is performed and a determination on whether the driver state is a sleeping state during the high autonomous driving level.

17. The driving control device according to claim 14, wherein
the display command transmission portion is configured to transmit the display command information that causes the HMI device to provide a main action instruction display and a sub-action instruction display,
the main action instruction display instructs for taking a main action including an action to adjust a driving posture as a driver state, and
the sub-action instruction display instructs for taking a sub-action including an action to adjust a driving awareness as the driver state.

18. The driving control device according to claim 17, wherein
the display command transmission portion is configured to set an action instruction timing at which the main action instruction display is displayed on the HMI device based on one of a duration for which the high autonomous driving level is performed and a determination on whether the driver state is a sleeping state during the high autonomous driving level.

19. The driving control device according to claim 17, further comprising:
a driver state acquisition portion that is configured to acquire the driver state; and
a vehicle control portion that is configured to perform a motion control for the vehicle through steering or acceleration/deceleration based on the autonomous driving level determined by the automation level determining portion, wherein
when the main action is not taken, the vehicle control portion is configured to provide a predetermined safety stop control, and
when the main action is taken but the sub-action is not taken, the vehicle control portion is configured not to provide the safety stop control and the display command transmission portion is configured to transmit the display command information that causes the HMI device to provide a warning display.

20. An HMI control device configured to control an HMI device that displays an image visibly recognized by a driver of a vehicle, the vehicle being capable of performing automated driving, the HMI control device comprising:
at least one processor; and
at least one memory storing a program that comprises instructions, when executed by the at least one processor, causing the at least one processor to:
acquire an autonomous driving level determined based on a traveling situation acquired at least by a driving control device that is configured to control an operation of the vehicle;
control an image display operation of the HMI device according to the acquired autonomous driving level;
when terminating a high autonomous driving level as the autonomous driving level under the automated driving, control the HMI device to provide an action instruction display that instructs the driver to take a low-level associated state as a driver state so as to handle a low autonomous driving level, which is an autonomous driving level at which an in-vehicle system does not provide at least lateral motion control based on steering or longitudinal motion control based on acceleration/deceleration, wherein the low autonomous driving level is the autonomous driving level lower than the high autonomous driving level and a middle autonomous level; and
control the HMI device to provide the action instruction display that instructs the driver to take the low-level associated state without actually transitioning the vehicle to the low autonomous driving level when terminating the high autonomous driving level and transitioning to the middle autonomous level as the autonomous driving level between the high autonomous driving level and the low autonomous driving level.

21. A driving control device configured to control an operation of a vehicle capable of performing automated driving, the driving control device comprising:
at least one processor; and
at least one memory storing a program that comprises instructions, when executed by the at least one processor, causing the at least one processor to:
acquire a traveling situation of the vehicle from various sensors as various information;
determine an autonomous driving level based on the acquired traveling situation;
provide at least vehicle speed control, steering control or braking control, according to the determined autonomous driving level;
terminate a high autonomous driving level as the autonomous driving level under the automated driving;
temporarily transition to a low autonomous driving level as the autonomous driving level lower than a middle autonomous level and the high autonomous driving level; and then
transition to the middle autonomous level as the autonomous driving level between the high autonomous driving level and the low autonomous driving level;
wherein the instructions of the program, when executed by the at least one processor, further cause the at least one processor to:
set a mode of changing the autonomous driving level from the high autonomous driving level to the middle autonomous level based on one of a duration for which the high autonomous driving level is performed and a determination on whether a driver state of a driver of the vehicle is a sleeping state during the high autonomous driving level; and
when the duration for which the high autonomous driving level is performed is shorter than a specified time, transition from the high autonomous driving level to the middle autonomous level without transitioning to the low autonomous driving level.

* * * * *